(12) United States Patent
Yun et al.

(10) Patent No.: US 8,232,976 B2
(45) Date of Patent: Jul. 31, 2012

(54) PHYSICALLY RECONFIGURABLE INPUT AND OUTPUT SYSTEMS AND METHODS

(75) Inventors: Tiffany Yun, Fremont, CA (US); David Kryze, Campbell, CA (US); Lucas Divine, San Jose, CA (US); Alex Wood, Mountain View, CA (US); Daniel Santos, San Francisco, CA (US)

(73) Assignee: Panasonic Corporation of North America, Secaucus, NJ (US)

( * ) Notice: Subject to any disclaimer, the term of this patent is extended or adjusted under 35 U.S.C. 154(b) by 190 days.

(21) Appl. No.: 12/732,087

(22) Filed: Mar. 25, 2010

(65) Prior Publication Data
US 2011/0234502 A1 Sep. 29, 2011

(51) Int. Cl.
G06F 3/041 (2006.01)
(52) U.S. Cl. ......................... 345/173; 345/156
(58) Field of Classification Search ............. 345/174, 345/169, 173, 156, 108; 340/407.2
See application file for complete search history.

(56) References Cited

U.S. PATENT DOCUMENTS

| | | | | |
|---|---|---|---|---|
| 5,717,423 | A * | 2/1998 | Parker | 345/156 |
| 6,155,220 | A * | 12/2000 | Marriott | 464/73 |
| 6,535,201 | B1 * | 3/2003 | Cooper et al. | 345/173 |
| 6,680,677 | B1 | 1/2004 | Tiphane | |
| 7,138,985 | B2 | 11/2006 | Nakajima | |
| 7,382,357 | B2 * | 6/2008 | Panotopoulos et al. | 345/173 |
| 2002/0196257 | A1 * | 12/2002 | Paolini et al. | 345/467 |
| 2006/0044279 | A1 | 3/2006 | Nasu et al. | |
| 2007/0140875 | A1 * | 6/2007 | Green | 417/413.2 |
| 2007/0247420 | A1 | 10/2007 | Strohband et al. | |
| 2008/0012835 | A1 * | 1/2008 | Rimon et al. | 345/173 |
| 2008/0303782 | A1 | 12/2008 | Grant et al. | |
| 2009/0132093 | A1 | 5/2009 | Arneson et al. | |
| 2010/0162109 | A1 | 6/2010 | Chatterjee et al. | |
| 2010/0207490 | A1 * | 8/2010 | Chuang | 345/184 |
| 2011/0260988 | A1 * | 10/2011 | Colgate et al. | 345/173 |

OTHER PUBLICATIONS

Greene, Kate; Touch Screens With Pop-Up Buttons; Technology Review; Apr. 28, 2009; (2 pages); published by MIT; http://www.technologyreview.com/printer_friendly_article.aspx?id=22550&channel=comp.
Ricker, Thomas; Carnegie Mellon morph's 'pop-up buttons' onto multi-touch display; Engadget; Apr. 28 2009 (3 pages); http://www.engadget.com/2009/04/28/carnegie-mellon-morphs-pop-up-buttons-onto-multi-touch-display/.
CEATAC Japan 2008 Article (4 pages); http://plusd.itmedia.co.jp/mobile/articles/0810/02/news117.html.
PCT Search Report Dated May 19, 2011.
Carnegie Mellon Morphs "Pop-Up Buttons" onto Multi-Touch Display, pp. 1-3.
Technology Review, Touch Screens with Pop-Up Buttons, pp. 1-4.
Technology Review, Touch Screens with Pop-Up Buttons, pp. 1-5.
Technology Review, Touch Screens with Pop-Up Buttons, pp. 1-3, Apr. 28, 2009.

* cited by examiner

Primary Examiner — Bipin Shalwala
Assistant Examiner — Ryan A Lubit

(57) ABSTRACT

Systems and methods for altering the shape of a reconfigurable surface area are presented. The present systems and methods facilitate efficient and effective interaction with a device or system. In one embodiment, a surface reconfiguration system includes a flexible surface; an elevation unit that creates alterations in the contours of the surface; and an elevation control component that controls adjustments to the elevation unit. Thus, the surface of the device is reconfigurable based on system, application, mode, and/or user needs. Accordingly, the surface can be used to provide input and output functionality. The surface can include touch detection functionality for added input functionality.

46 Claims, 41 Drawing Sheets

500

510
Performing an elevation determination process.

> 511
> Determining a current utilization or activity.
>
> 512
> Extrapolating a desirable corresponding surface shape configuration.

520
Elevation unit adjustment process.

521 Determine if an elevation unit is associated with a surface area shape.

yes → 522 Adjust elevation unit to achieve surface area shape.

no → 523 Maintain elevation unit position.

FIGURE 5

(Side View)

(Top View)

(Side View)

(Side View)

(Top View)

PHYSICALLY RECONFIGURABLE INPUT AND OUTPUT SYSTEMS AND METHODS

FIELD OF THE INVENTION

The present invention relates to the field of configurable input and output systems.

BACKGROUND OF THE INVENTION

Electronic systems traditionally have not been highly proficient at adjusting to user's needs or wants relating to input and output interactions. For example, a display monitor connected to a personal computer cannot do other forms of output. A standard keyboard has one layout (e.g. QWERTY) that the user can only change by purchasing a new keyboard. The inability of input and output devices for electronic systems to adjust based on user preferences or needs is a problem.

Input and output interactions can greatly affect user experience. This is especially true on smaller electronic devices and systems. Conventional inputs via button or key, for example, are typically limited to a designated or predetermined function. The buttons or keys are static to one size and not adjustable based on the user's size or desires. Traditional devices that attempt to handle applications that involve diverse inputs typically require a large number of different physical keys that take up a lot of space. Attempts at reducing the size of the keys so that they fit in smaller space often results in an inconvenient interface that makes accurate input extremely difficult. The key or button can be significantly smaller than a finger and susceptible to inaccurate manipulation.

Some traditional approaches attempt to utilize programmable input images. For example, some conventional approaches attempt to utilize a flat touch screen in which images associated with a key or button appear. However, typically a user has to look at the area of the touch screen associated with the input key or button in order to locate and properly register an input. Having to look at the area of the screen associated with a button or key typically means other activities (e.g. watching a movie, video game, operating a vehicle, etc.) the user is interested in are disrupted or occluded. In addition, the tactile response provided by a key cannot be accurately duplicated on such a touch screen implementation.

SUMMARY OF THE INVENTION

Systems and methods are presented for physically altering the three dimensional shape of a surface. The present systems and methods facilitate efficient and rich interaction (e.g. input operations, output operations, etc.) with a device or system. The surface of the device is reconfigurable based on a variety of considerations (e.g., system, application, mode, and/or user needs, etc.). In one embodiment, a surface reconfiguration method includes performing an elevation determination process; and performing an elevation unit adjustment process. The elevation determination process can include performing a query on characteristics associated with elevation unit element adjustments; and establishing elevation unit adjustments automatically based upon results of the query. The query can include determining an activity history (e.g., application that is running, user indicated surface configurations, etc.); and extrapolating a desirable configuration (e.g., height, width, layout, etc. of surface shapes). Establishing elevation unit adjustments automatically can include adjusting the elevation units to form a user interface (e.g., input component, a key, a joystick, an output component, etc.)

The elevation unit adjustment process can change the physical shape of an input and output surface area. Various types of input can be received including receiving touch sensed input, receiving physical click input from the physical actuation of one or more adjacent elevation units, et cetera. Various outputs can be stimulated including forming human-readable characters, forming non-clickable contours to indicate boundaries in a surface, et cetera.

Present systems and methods are compatible with a variety of mechanisms for adjusting the elevation unit. For example, adjusting the elevation can include creating a standing wave that applies force on the elevation unit to position the elevation unit at a designated elevation. Piezoelectric elements can be manipulated to create the standing wave. The wave can apply force on the elevation unit to position the elevation unit at a designated elevation. After being raised initially, the elevation unit can include mechanisms to return the elevation unit to the designated elevation without consuming extra power.

In one embodiment a surface reconfiguration system includes a flexible surface attached to the electronic device with a selectively variable shape; and an actuation sensing component for sensing actuation activity associated with the shape in the surface; wherein the flexible surface and actuation sensing component interact to provide both input and output to a user of the system. A portion of the surface associated with the selectively variable shape can be raised and lowered. The flexible surface and actuation sensing component can form a tactile input component. In one exemplary implementation the tactile input component senses touch. The tactile input component can be a physically clickable input key. The flexible surface can include a light emitting diode array or a liquid crystal display screen.

In one embodiment, the surface reconfiguration system also includes a piezoelectric motor ring including small piezoelectric elements for generating a standing wave when a voltage is applied to consecutive piezoelectric elements around the ring; and gears for transferring the rotational force of the standing wave to the actuation sensing component to move the actuation sensing component up and down. In addition, the surface reconfiguration system can also include processing circuitry; wherein the processing circuitry acquires actuation data from the actuation sensing component, processes the actuation data, and directs the raising and lowering of the selectively variable shape in the flexible surface.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 5 is flow chart of an exemplary surface reconfiguration method with sub-blocks or sub-processes in accordance with one embodiment of the present invention.

DETAILED DESCRIPTION

Reference will now be made in detail to exemplary embodiments, which are also illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

Present systems and methods facilitate efficient and effective changes in the surface contours of an electronic device. The alterations can include selectively changing the surface area shape. This can include raising, lowering, and elevating portions of a surface area. In one embodiment, a selectively raised surface area can be associated with an input/output mechanism (e.g., a key, button, joystick, etc.) and the raised surface area can be tactilely felt. In one exemplary implementation, the raised portion can be tactilely distinguished from other areas of a surface. It is appreciated that there are a variety of changes that can be made in the surface areas (e.g., raised, lowered, vibrated, etc.) for a variety of purposes (e.g., form an input key, form a three dimensional outline corresponding to an image, create output vibration, form a grip area, etc.). It is also appreciated that a variety of other features can be associated with the surface area (e.g., displaying an image, sensing a touch in a raised portion of the surface area, etc.). Additional explanation of some of the readily implemented features of present systems and methods are set forth below in other portions of the description.

Figure 1:
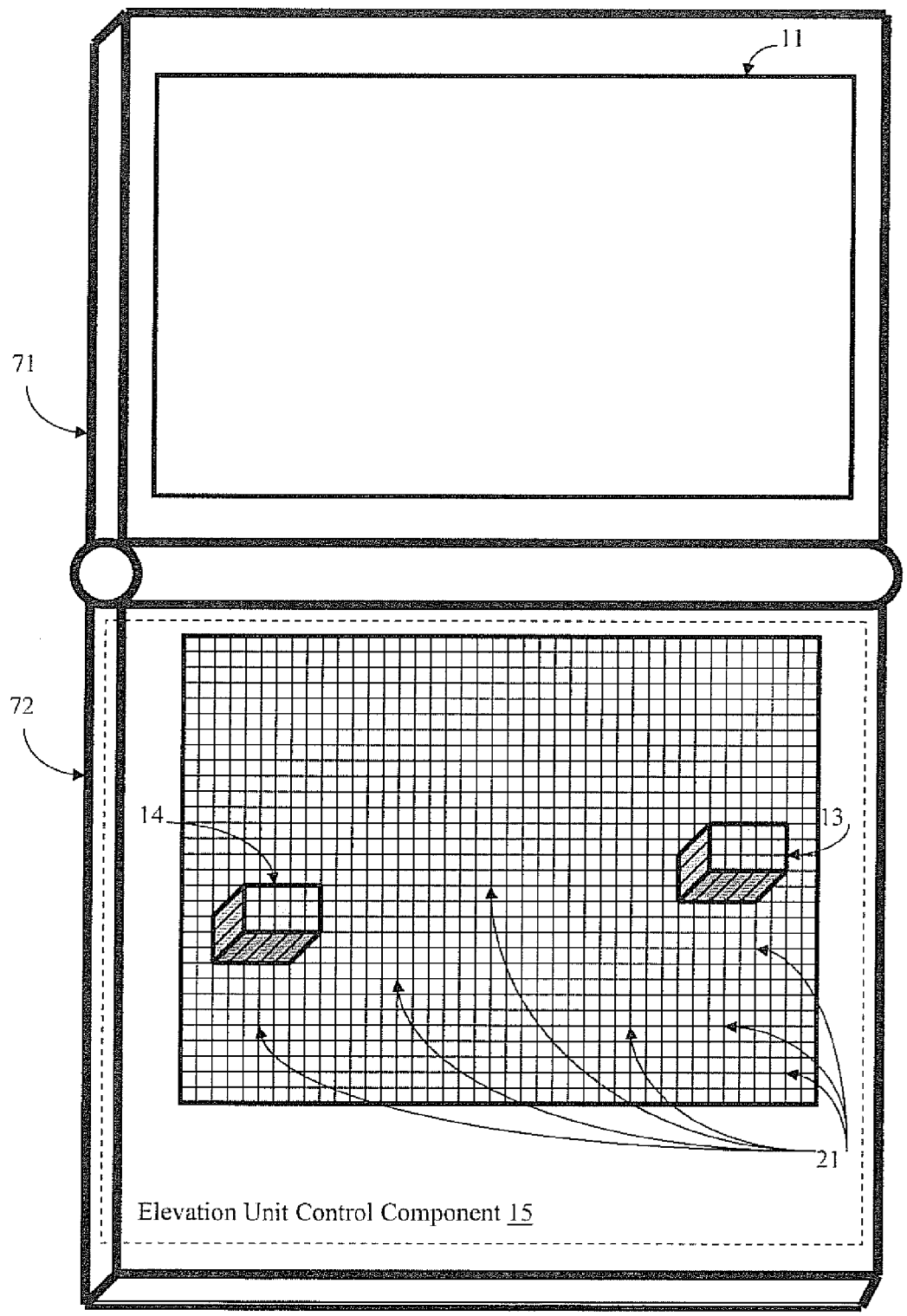
FIG. 1 is block diagram of an exemplary electronic device in accordance with one embodiment of the present invention.

FIG. 1 is block diagram of an exemplary electronic device 10 in accordance with one embodiment of the present invention. Electronic device 10 can be a mobile electronic device. Exemplary electronic device 10 includes a body with two body portions 71 and 72. The two body portions 71 and 72 can be a top and bottom portion, respectively, that fold out from a closed-book clamshell type layout. In alternate embodiments, a portion similar to portion 71 can slide up from on top of a portion similar to portion 72, or there are can be separate portions similar to portion 71 and 72. Exemplary electronic device 10 includes elevation units (e.g., shown typically as 21) situated in a matrix arrangement. In one embodiment, electronic device 10 includes a flexible surface component (not shown) covering the elevation unit matrix. The elevation units associated with areas 13 and 14 can be selectively raised to form part of a tactile, physically clickable input (e.g., a key, button, joystick, etc.). In one embodiment, the physically clickable input provides a tactile and audio feedback of the "click" sensation (e.g., similar to "click" sensations or feedback of conventional keyboard or input components). Exemplary electronic device 10 includes elevation unit control component 15 which controls adjustments (e.g., raising, lower, etc.) in the elevation units. Exemplary electronic device 10 also includes a display area 11 for displaying images.

The reconfigurable surface areas of electronic device 10 can be changed in a variety of shapes and configurations. In one embodiment, the elevation units can be selectively raised to form shapes and configurations associated with different applications (e.g., phone, game, etc.). In one exemplary implementation, the elevation control component 15 receives an indication of which application is active and directs elevation units to make surface shape adjustments (e.g., raise, lower, etc.) to form input keys corresponding to the active application.

Figure 2:
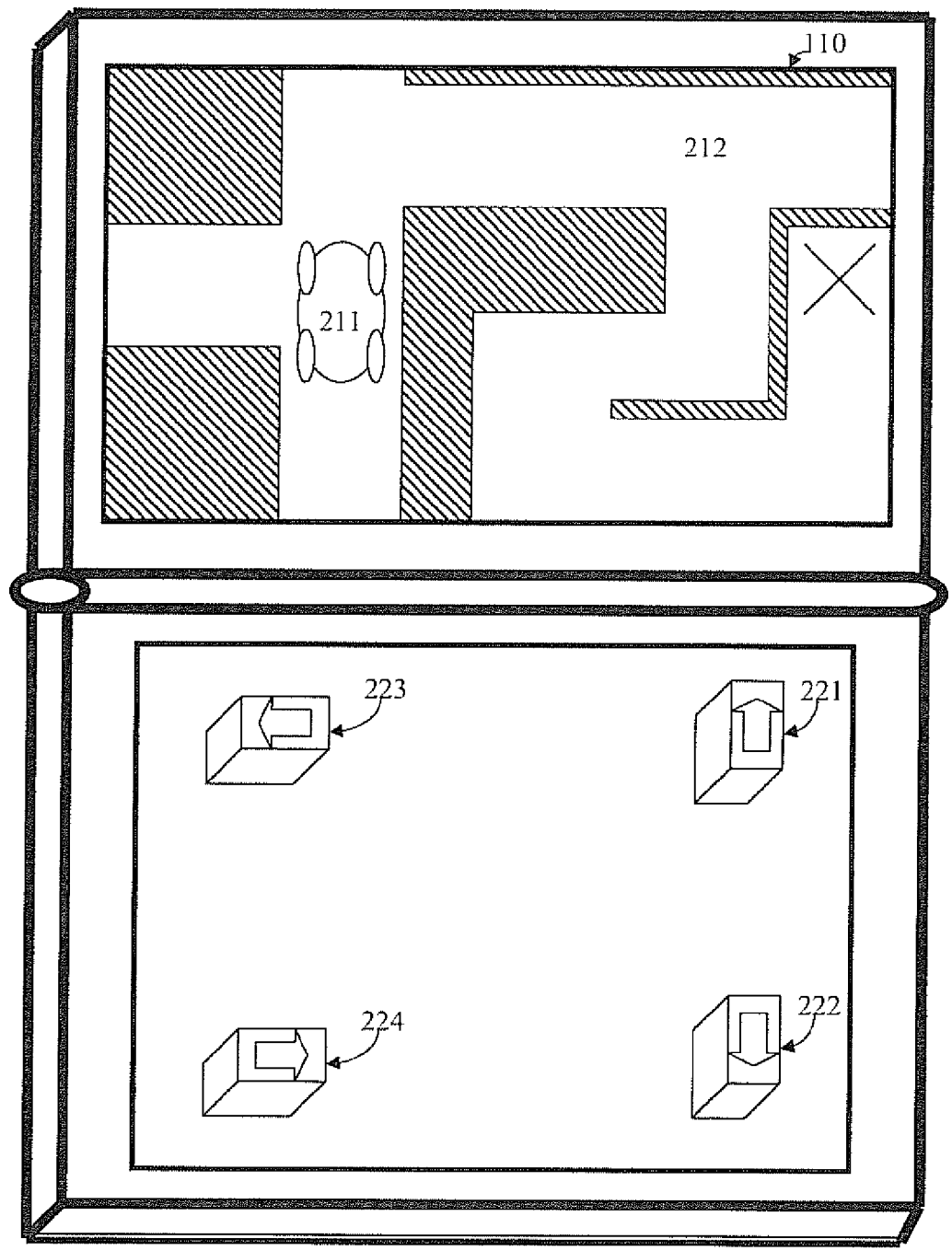
FIG. 2 is a block diagram of electronic device implementing an exemplary game application in accordance with one embodiment of the present invention.

FIG. 2 is a block diagram of electronic device 10 implementing an exemplary game application in accordance with one embodiment of the present invention. The game application includes a game piece 211 and pathways 212 of a maze presented on display area 11. The game application involves directing the game piece 211 along pathway portions of the maze to a destination "X". The game piece 211 moves according to input received via directional input keys 221 through 224. Directional input keys 221 through 224 are formed by selectively raising elevation units associated with corresponding input key surface areas. A user can physically click the keys 221 through 224 by pressing down on the keys. Even if a user presses upon one part of a key (e.g. the left part of key 223 for example) all of the elevation units associated with the key will physically click.

Figure 3:
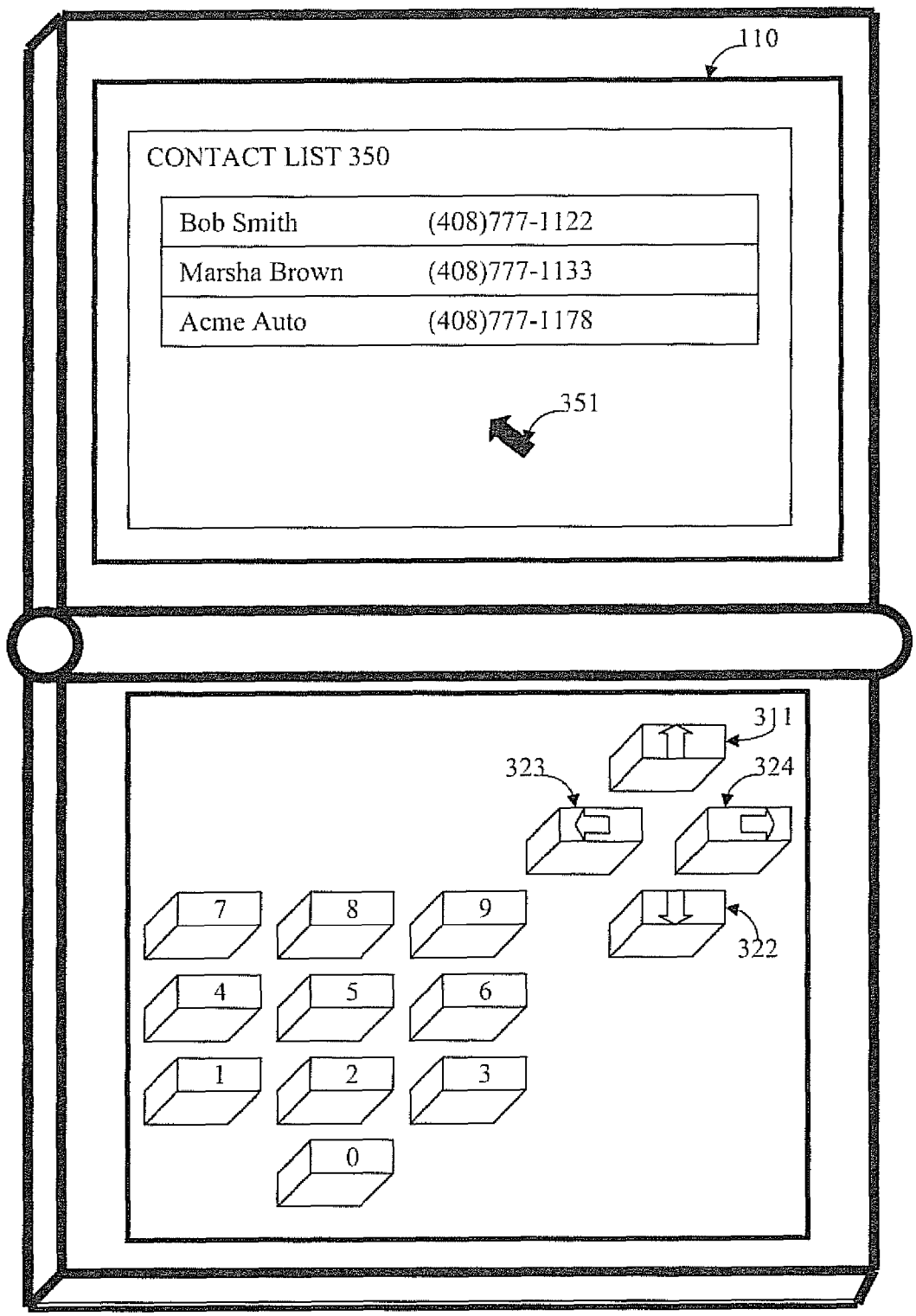
FIG. 3 is a block diagram of an exemplary electronic device implementing an exemplary communication application in accordance with one embodiment of the present invention.

FIG. 3 is a block diagram of an electronic device 100 implementing an exemplary communication application in accordance with one embodiment of the present invention. The communication application includes a cursor 351 and contact list 350 with names and phone numbers presented on display area 110. The communication application involves communication activities (e.g., phone call, internet browsing, etc.) and includes an editable contact list 350. Cursor control keys 311, 322, 323, and 324 direct cursor 351 to point to information (e.g. name, phone number, etc.) on display 110, and alpha/numerical input keys 0 through 9 can be utilized to enter and change information new information in the contact list 350. Cursor control keys 311, 322, 323, and 324 and alpha/numerical input keys 0 through 9 are formed by selectively raising elevation units associated with corresponding input key surface areas. Thus, the location of the keys could be anywhere on the surface of the input area and not necessarily in the layout shown in FIG. 3.

While explained in terms of input component configurations (e.g., key, button, etc.) with respect to FIGS. 1 through 3, it is appreciated that the present elevation unit features can be utilized for a variety of purposes. Additional explanation of some of these purposes is provided below in other portions of the description. The following description is generally organized in sections that set forth: 1) exemplary general methods; 2) exemplary system and device configurations; 3) various exemplary surface shapes that can be created; 4) methods of defining surface shapes; 5) exemplary input features that can be coordinated with the surface shapes; 6) exemplary output features that can be coordinated with the surface shapes; and 7) various exemplary use descriptions.

Exemplary General Methods

It is appreciated that the present systems and methods can have the following general characteristics:
 a) selectively forming a shape in a surface area of a device (e.g., to form a key, to form a grip portion, etc.); and
 b) coordinating the surface area shape formation with other features or characteristics (e.g., coordinate with a touch sensing characteristic, coordinate with a display, etc).

For example, it is appreciated that present elevation units can be utilized to selectively change the shape of a surface area of a device. The elevation units can facilitate flexible implementation and reconfiguration of a variety of surface area configurations. In one embodiment, a surface area can be selectively configured to form one of a plurality of shapes (e.g., a square key, a rectangle grip portion, etc.), and at another time, can be flexibly selected to form another one of a plurality of shapes (e.g., a round joystick, an outline of an image, etc.). Present systems and methods can be utilized to coordinate manipulation of elevation units with other features or characteristics of a device. For example, it is appreciated that the surface area associated with the elevation units can also be associated with other features including a display overlaying the surface area and/or touch sensing incorporated into the surface. Additional explanation of these and other characteristics are set forth below.

Figure 4:
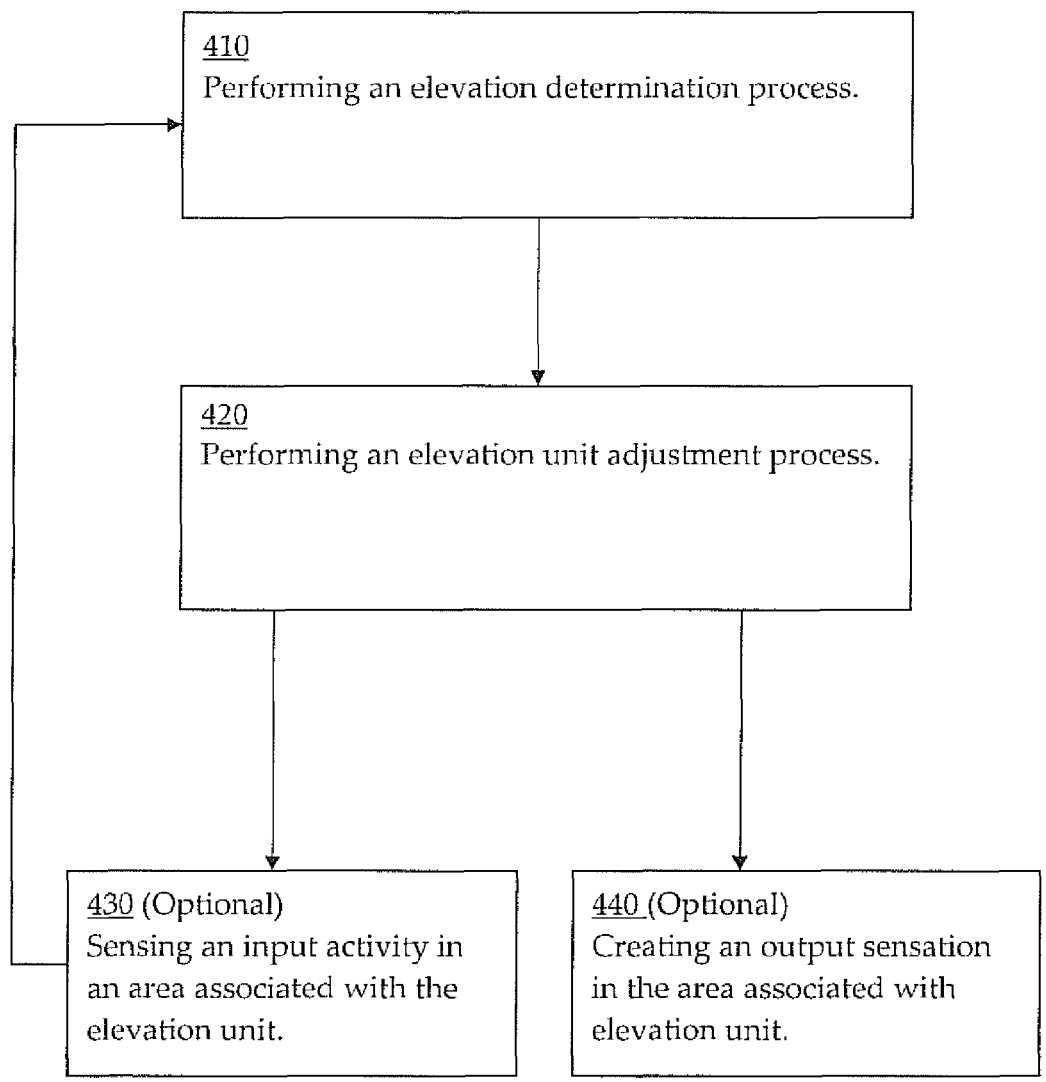
FIG. 4 is flow chart of an exemplary surface reconfiguration method in accordance with one embodiment of the present invention.

FIG. 4 is flow chart of surface shape reconfiguration method 400 in accordance with one embodiment of the present invention. Surface shape reconfiguration method 400 can be utilized to create or change various features of parts of a surface area (e.g., shape, size, layout, position, height, etc.). In one embodiment, surface shape reconfiguration method 400 is utilized to selectively form input keys for an electronic device.

In block 410, a surface shape determination process is performed. In one embodiment, the surface shape determination process includes determining a current or present desirable surface shape. The desirable surface shape can correspond to desirable surface shape features (e.g., a desirable surface key input feature, a desirable surface grip feature, a desirable surface image presentation, etc.). It is appreciated a desirable surface shape can be coordinated with device utilization or activity (e.g., a word processing application, a video game application, a telecommunication application, etc). In one embodiment, the surface shape determination process includes receiving an indication of surface area shape (e.g., height, length, width, location, etc.). The indication of surface area shape can be a response to a query or can be independently forwarded. Additional explanation of these and other characteristics of a surface shape determination process are set forth below in other portions of the description.

In block 420, an elevation unit adjustment process is performed. The elevation unit adjustment process includes determining whether an elevation unit is associated with an area of the surface shape established in block 410 above. In one embodiment, if an elevation unit is associated with the area the elevation unit is adjusted to form the designated surface shape. The elevation unit can be raised or lowered to many different elevation levels. Additional explanation of these and other characteristics of an elevation unit adjustment process are set forth below in other portions of the description.

In optional block 430, an input activity associated with a surface area is detected. In one embodiment, the surface area corresponds to the surface shape. In one embodiment, the input activity can be an input actuation. It is appreciated there can be a variety of input detecting mechanisms (e.g., press, touch, capacitive, gesture, squeeze, etc.). Additional descriptions on a variety of exemplary input features are set forth are set forth below in other portions of the description.

At optional block 440, an additional output is created in a surface area associated with the shape. It is appreciated that a variety of outputs can be created in a surface area (e.g., a 2D or 3D visual display, a tactile sensation, etc.). In one embodiment, an output corresponds to a tactile "click" sensation associated with actuation of a key. In one exemplary implementation, the output sensation is a vibrating sensation associated with an application event (e.g., a car crashes, a baseball is hit by a bat, a door closes, etc.). Additional descriptions of various exemplary output features are set forth below in other portions of the description.

It is appreciated that processes or blocks within surface shape reconfiguration method 400 can include sub-processes or sub-blocks. FIG. 5 is flow chart of surface shape reconfiguration method 500 with sub-blocks or sub-processes in accordance with one embodiment of the present invention. In one embodiment, surface shape reconfiguration method 500 is similar to surface shape reconfiguration method 400 and includes surface shape determination process 510 and elevation unit adjustment process 520. In one exemplary implementation, surface shape determination process 510 includes sub-blocks 511 and 512 and elevation unit adjustment process 520 includes sub-blocks 521, 522 and 523.

In sub-block 511, a current utilization or activity is determined. The utilization/activity information can be from the user, device, or application. In one embodiment, determining a current utilization or activity includes examining a current active mode indication (e.g., game mode, phone mode, application mode, surface shape input mode, etc.). In one exemplary implementation, determining a current utilization or activity includes examining a current active application indication (e.g., a word processing application, a gaming application, a mobile communication application, a browser application, etc.). Determining a current utilization or activity can also include examining current surface interaction activity (e.g., what portion of an area is touched, what portions experience a force, etc.).

In sub-block 512, a desirable corresponding surface shape configuration is extrapolated. In one embodiment, information is retrieved defining shapes and layout of desirable shapes (e.g., key, button, joystick, etc.) that are associated with the current utilization or activity (e.g., keypad, adjustable grip, game, display, etc.). The information can include dimensions of the shape and the location or layout on a device surface. For example, the information can include a size of a shape (e.g., height, length, width, etc.) and a distance of a shape feature (e.g., distance of: a center point of the shape, an edge of the shape, etc.) from a feature of a device (e.g., the center point of the device, an edge of an area of the device, etc.). The information can be received from the surface area associated with a shape (e.g., information from a portion of a surface associated with a shape indicating the shape should change size, location, etc.). In one exemplary implementation, information from a user pressing on a side of a shape indicates the surface shape should move in the direction a user is pushing it. Additional descriptions of desirable corresponding surface configuration approaches are set forth in other portions of the description.

In block 521, a determination is made if an elevation unit is associated with a surface area shape. The elevation unit adjustment process includes determining whether an elevation unit is associated with an area of the surface shape from the surface shape determination process in 510. If the elevation unit is not associated with a surface area shape the process proceeds to block 523. If the elevation unit is associated with a surface area shape the process proceeds to block 522.

In block 522, the elevation unit is adjusted to achieve the desired surface area shape. In one embodiment, an elevation unit can be raised, lowered, or remain stationary, depending on the needed adjustment to achieve the desired surface area shape. It is appreciated that a variety of mechanisms can be readily implemented to perform elevation unit adjustment. For example, elevation unit movements can be actuated by fluid, gel, air pressure, electro-active polymers, stepper motors, servo motors, linear servo actuators, pneumatic devices, muscle wire, electro magnetic actuators, ultrasonic motors, et cetera. In one exemplary implementation, adjusting the elevation unit includes creating a standing wave that supports the elevation unit in position (e.g., raised, lowered, nominal, etc.). In one exemplary implementation, piezoelectric elements are manipulated to create a standing wave.

In block 523, the elevation unit position is maintained. In one embodiment, a standing wave can be utilized to maintain an elevation unit position. Alternatively, a standing wave can be utilized to raise a physically clickable elevation unit into position. Once raised into position, the physically clickable mechanism can be utilized to "maintain" or return the elevation unit to the position. No electrical power is needed to maintain elevation unit height in this embodiment.

Figure 6:
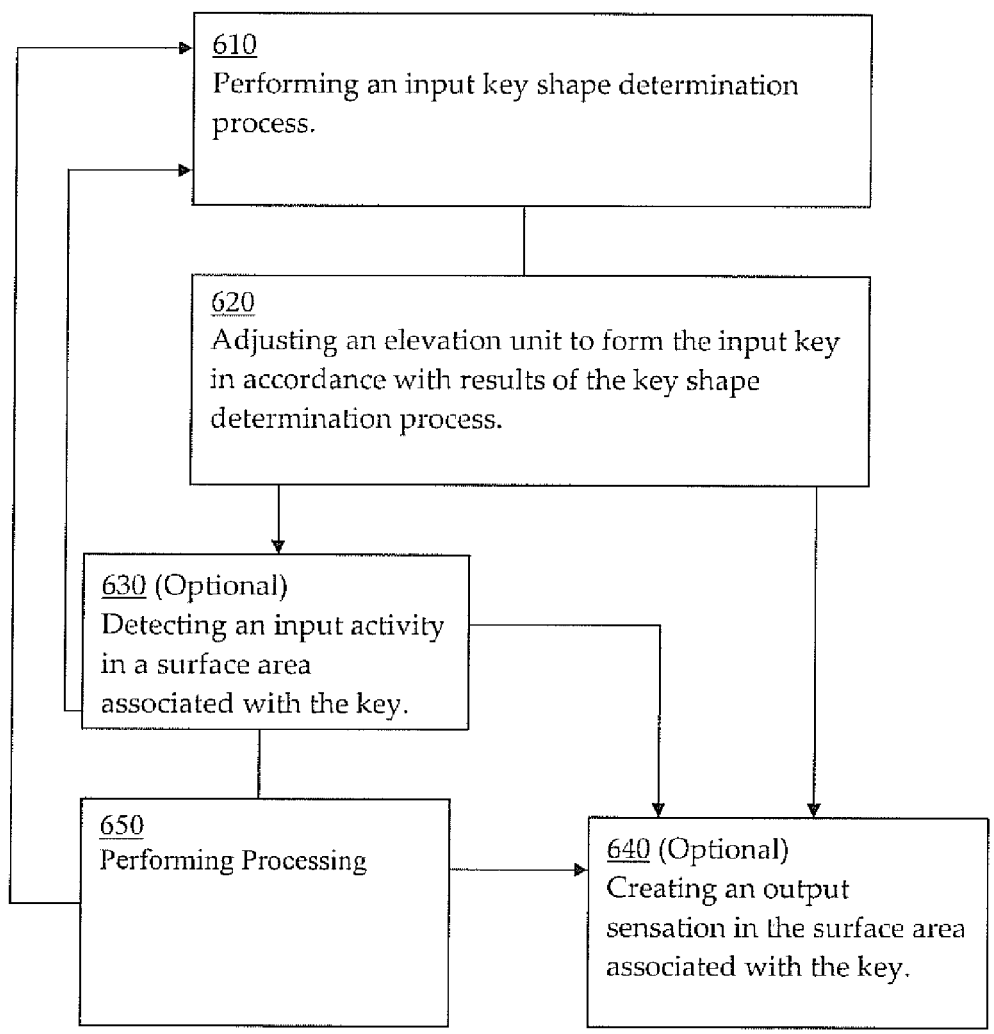
FIG. 6 is flow chart of an exemplary surface reconfiguration method associated with other operations in accordance with one embodiment of the present invention.

FIG. 6 is a flow chart of surface shape reconfiguration method 600 that is associated with other operations in accordance with one embodiment of the present invention. Blocks 610 through 640 are similar to blocks 410 through 440, respectively. Surface shape reconfiguration method 600 includes optional block 650 in which additional processing can be performed. Various differing types of additional information processing can be performed. In one embodiment, processing is performed on input information received in block 630. The processing can be performed on information from various input components (e.g., key, button, joystick, touch screen, etc.) formed by a surface area associated with an elevation unit. In one embodiment, processing is performed on output information forwarded to block 640. The processing can be performed on information associated with an output (e.g., vibration, image display, etc.) in an area associated with an input component (e.g., key, button, joystick, touch screen, etc.) formed by a surface area associated with an elevation unit.

System/Device Configurations

Figure 7:
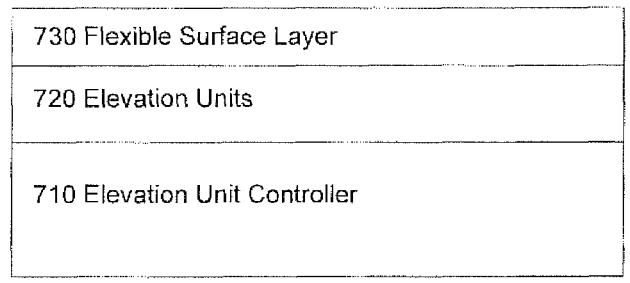
FIG. 7 is a block diagram of an exemplary surface reconfiguration system in a tiered or layered arrangement in accordance with one embodiment of the present invention.

In one embodiment, the surface shape reconfiguration system is arranged in a tiered or layer approach or architecture. FIG. 7 is a block diagram of an exemplary surface shape reconfiguration system 700 in a tiered or layered arrangement in accordance with one embodiment of the present invention. The embodiment includes three layers. Layer 3 includes an elevation unit controller 710. In one embodiment, the elevation unit controller includes a motor/rotor/gear combination. Layer 2 includes elevation units 720. The elevation units can move up and down freely. Layer 1 includes a top flexible surface layer 730. Flexible surface layer 730 can include a flexible display technology (e.g. LCD, LED array, etc.) and/or touch detection technology.

Figure 8:
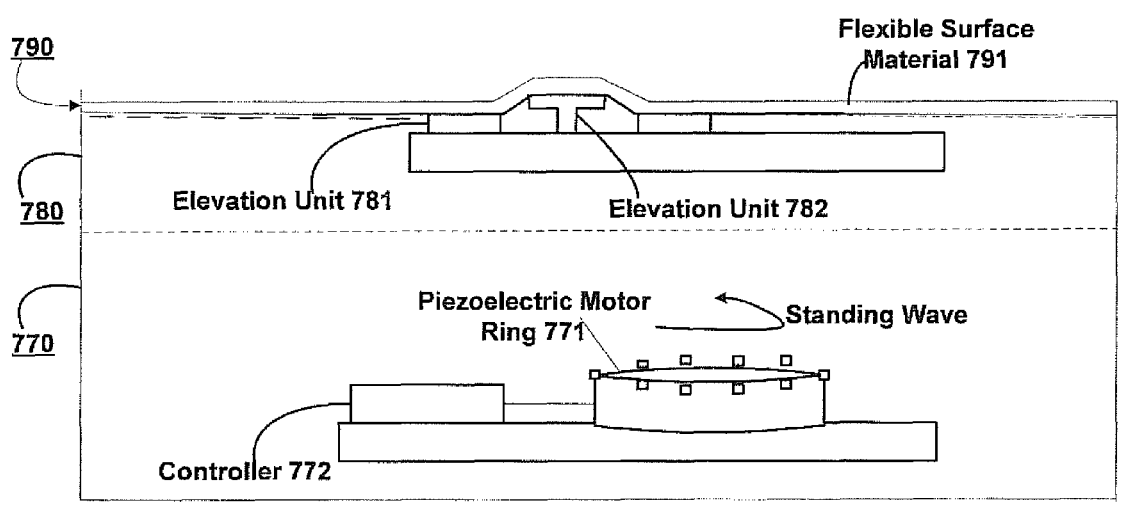
FIG. 8 is a block diagram of an exemplary surface reconfiguration system in a tiered or layered embodiment with a piezoelectric elevation unit controller in accordance with one embodiment of the present invention.

FIG. 8 block diagram of an exemplary surface shape reconfiguration system 750 in a tiered or layered embodiment with a piezoelectric elevation unit controller in accordance with one embodiment of the present invention. The components of surface shape reconfiguration system 750 cooperatively operate to alter the contour and shape of reconfigurable surface 791 as part of the top-most surface 790. Reconfigurable surface 791 includes flexible surface material that rises or lowers based upon movements in elevation units of layer 780. The elevation units (e.g., 781, 782, etc.) of layer 780 can move up and down freely. In the exemplary implementation of FIG. 8, elevation unit 782 is raised.

In one embodiment, the elevation units can include physically clickable mechanisms. In one exemplary implementation, after being raised into position (e.g., under control of elevation unit controller in layer 770) the elevation unit position is "maintained" by a physically clickable mechanism. For example, after being raised into position, the elevation unit position can be maintained or operated similar to a conventional key board button or joystick. The physically clickable mechanism can include a mechanical component (e.g., spring, lever, etc.) that maintains an elevation unit in the raised position when no overriding external force is applied. The mechanical component can return the elevation unit to the raised position if the elevation unit is temporarily depressed by an external force (e.g., a finger, stylus, etc.). In the present embodiment, no electrical power has to be consumed to maintain or return the elevation unit to the raised position. When the elevation unit is no longer required or desired to be raised, the elevation unit can be lowered (e.g., under control of elevation unit controller in layer 770.

The elevation units are raised and lowered under the control of an elevation unit controller in layer 770. It is appreciated that present systems can be readily implemented with various numbers of layers and sub-layers. The elevation unit controller in layer 770 includes a thin piezoelectric motor ring 771 and a motor controller 772. The thin piezoelectric motor ring 772 has a plurality of small piezoelectric elements organized in a circular or ring pattern. Motor controller 772 issues a small voltage to the piezoelectric elements individually that excites the respective piezoelectric element. When the small voltage is applied to consecutive piezoelectric elements around the ring a standing wave is created, generating a rotational force that is used to raise or lower (depending on wave direction) elevation units above the motor ring. This rotational force can be transferred along a system of gears and/or rotors to move the elevation units up and down. In one embodiment, once an elevation unit is in the raised state, it no longer requires power to maintain the raised state. If a user presses down upon the elevation unit for a key-click, the elevation unit will return to its set position without any additional power needed. Advantages of a piezoelectric motor implementation can include a thin size, ease of portability, and inexpensive cost compared to other implementations.

Figure 9:
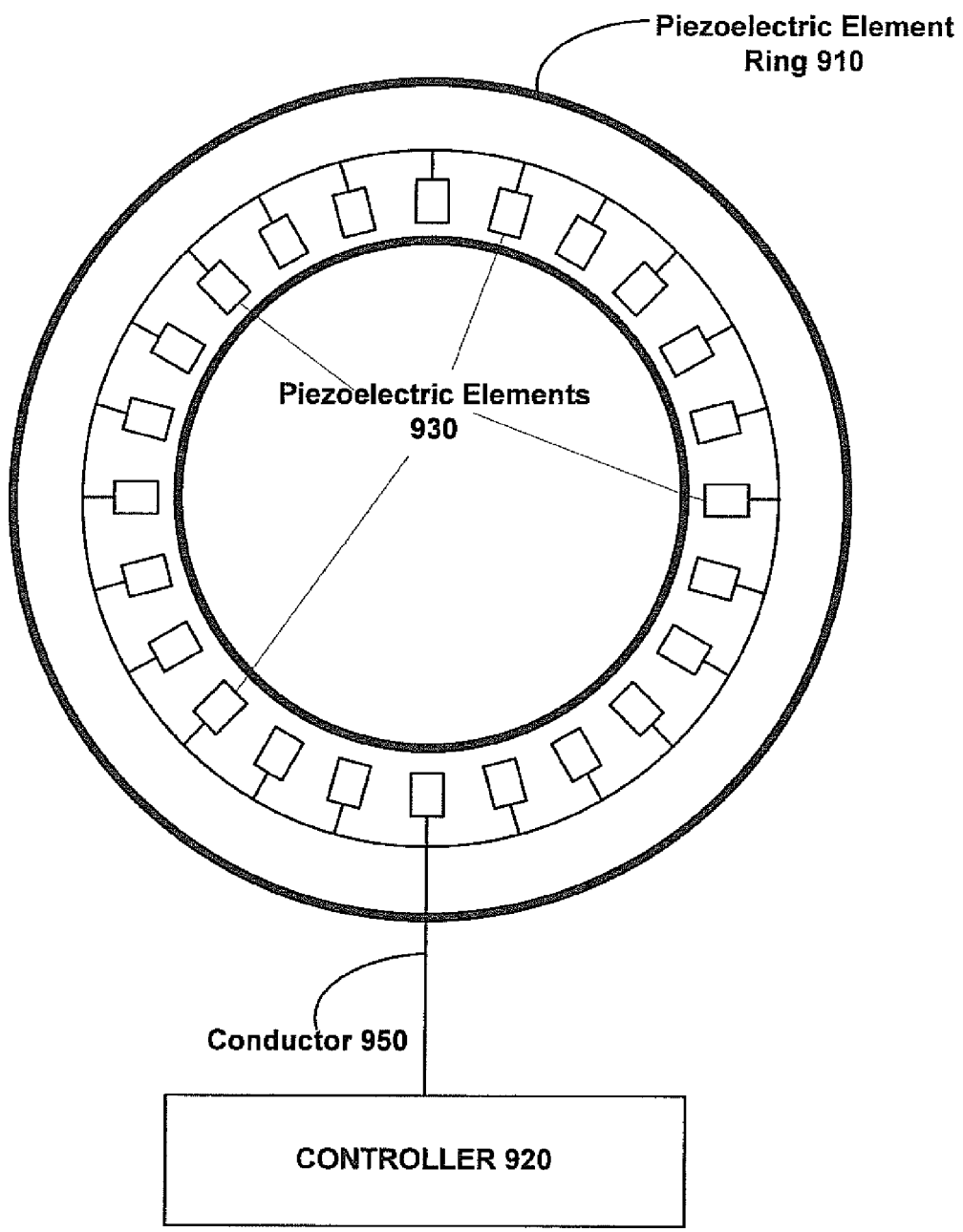
FIG. 9 is a top view of an exemplary piezoelectric motor in accordance with one embodiment.

FIG. 9 is a top view of an exemplary piezoelectric motor 900 in accordance with one embodiment. Piezoelectric motor 900 includes piezoelectric motor ring 910, conductor 950, and controller 920. Piezoelectric motor ring 910 includes piezoelectric elements 930 which are sequentially excited by applying a voltage from motor controller 920. The circular sequential excitation of the piezoelectric elements creates a standing wave.

Figure 10:
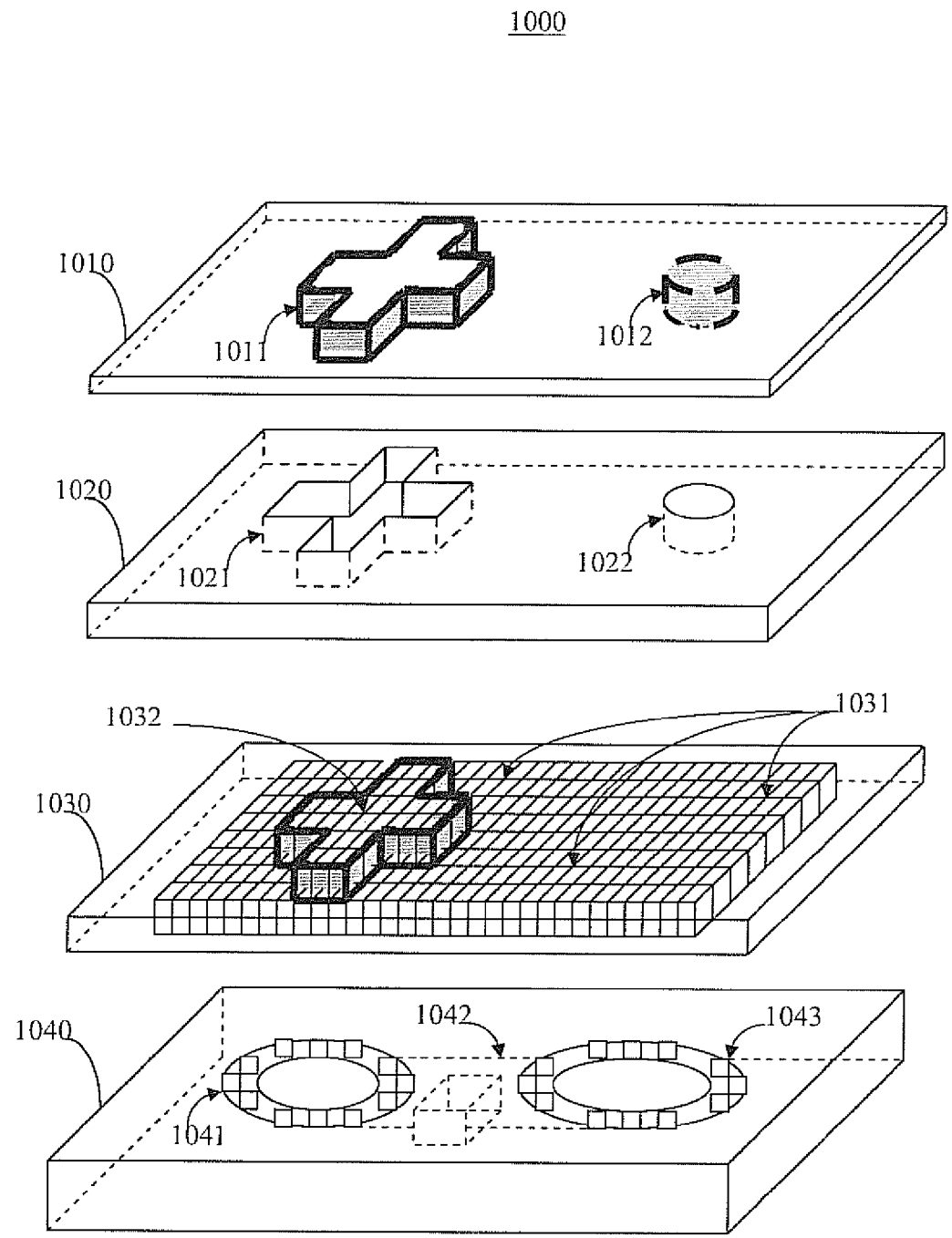
FIG. 10 is a block diagram of another exemplary surface reconfiguration system in a tiered or layered embodiment with a separate pattern controller component in accordance with one embodiment of the present invention.

FIG. 10 is a block diagram of another exemplary surface shape reconfiguration system 1000 in a tiered or layered embodiment with a separate pattern controller component in accordance with one embodiment of the present invention. Surface shape reconfiguration system 1000 includes a plurality of mechanism layers 1010, 1020, 1030 and 1040. Layer 1040 includes motor controller 1042 and piezoelectric motors 1041 and 1043. Layer 1030 includes elevation units 1031 for raising and lowering according to the desires of the device, mode, software application, or user. Layer 1020 includes an elevation unit pattern controller with patterns 1021 and 1022. Layer 1020 is not a required part of the system, but can be added for ease of use. Layer 1010 includes a top flexible surface in which surface shapes 1011 and 1012 are formed. It is appreciated that the layers are shown separated by a distance but can be implemented directly on top of one another. Additional layers can also be added above or below each layer for added functionality such as touch input or visual or tactile output.

Figure 11:
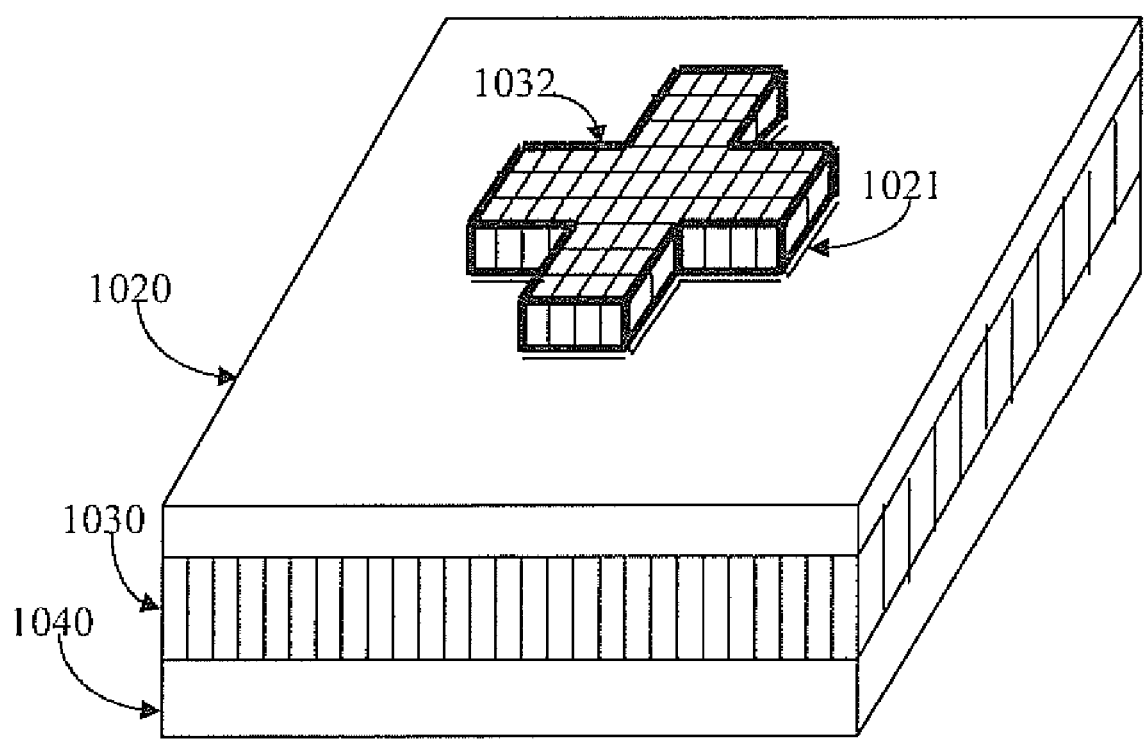
FIG. 11 is a block diagram of an exemplary portion of the surface reconfiguration system with a portion of the layers shown implemented directly on top of one another.

In one exemplary implementation, the elevation unit pattern controller 1020 is a template or member (e.g., metal, plastic, etc.) with patterns formed (e.g., cut, stamped, etc.) in the body. The patterns correspond to a surface area shape (e.g., a key, joystick, grip, etc.). The patterns (e.g., 1021, 1022, etc.) facilitate control of the elevation units which are adjusted (e.g., which elevation units move or pushup to form a surface area shape). In one embodiment, elevation units are pushed up by a force from a motor/rotor combination included in layer 1040. The cut out patterns (e.g., 1021, 1022, etc.) control which elevation units actually raise and push up to form a surface shape. When the elevation units attempt to rise, the areas overlaid by the template do not raise and those areas that are not impeded are raised. This can be achieved through the resistive force of the template pushing down on the elevation unit or via a sensing mechanism that detects the presence of the template. In the present implementation, the pattern 1021 permits the elevation units in area 1032 to push up and form shape 1011 in the surface layer 1010. When elevation units under pattern 1002 (shown in lowered position) are raised they can form a shape 1012 in the surface layer 1010. It is appreciated that the layers are shown separated by a distance but can be implemented directly on top of one another. FIG. 11 is a block diagram of an exemplary portion of the surface shape reconfiguration system 1000 with a portion of the layers shown implemented directly on top of one another.

Figure 12:
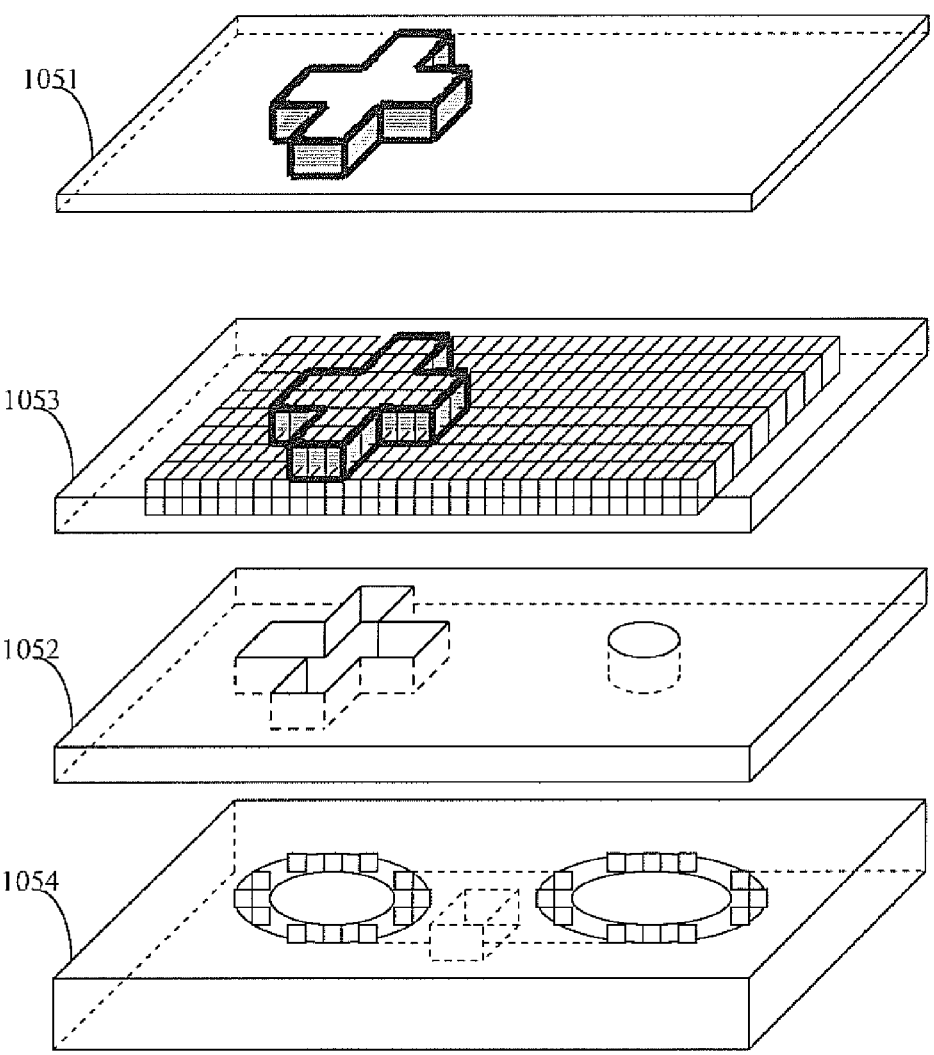
FIG. 12 is a block diagram of another exemplary surface reconfiguration system in a tiered or layered embodiment in accordance with one embodiment of the present invention.

As shown in FIG. 12, a pattern controller component can be in a layer below an elevation unit layer. FIG. 12 is a block diagram of another exemplary surface shape reconfiguration system 1050 in a tiered or layered embodiment in accordance with one embodiment of the present invention. Surface shape reconfiguration system 1050 is similar to surface shape reconfiguration system 1000 except the pattern controller component 1052 is in a layer below the elevation unit laye1 1053. Layers 1051 and 1054 are similar to layers 1120 and 1040, respectively. In one embodiment, the elevation unit pattern controller layer can be a sub layer of the elevation unit controller layer and in another exemplary implementation it can be independent elevation unit pattern controller layer. In the exemplary implementation of FIG. 12, the piezoelectric motor under the cylinder shape is not actuated and the cylinder shape is not projected on the surface layer 1051 even though there is a pattern in layer 1052.

Figure 13:
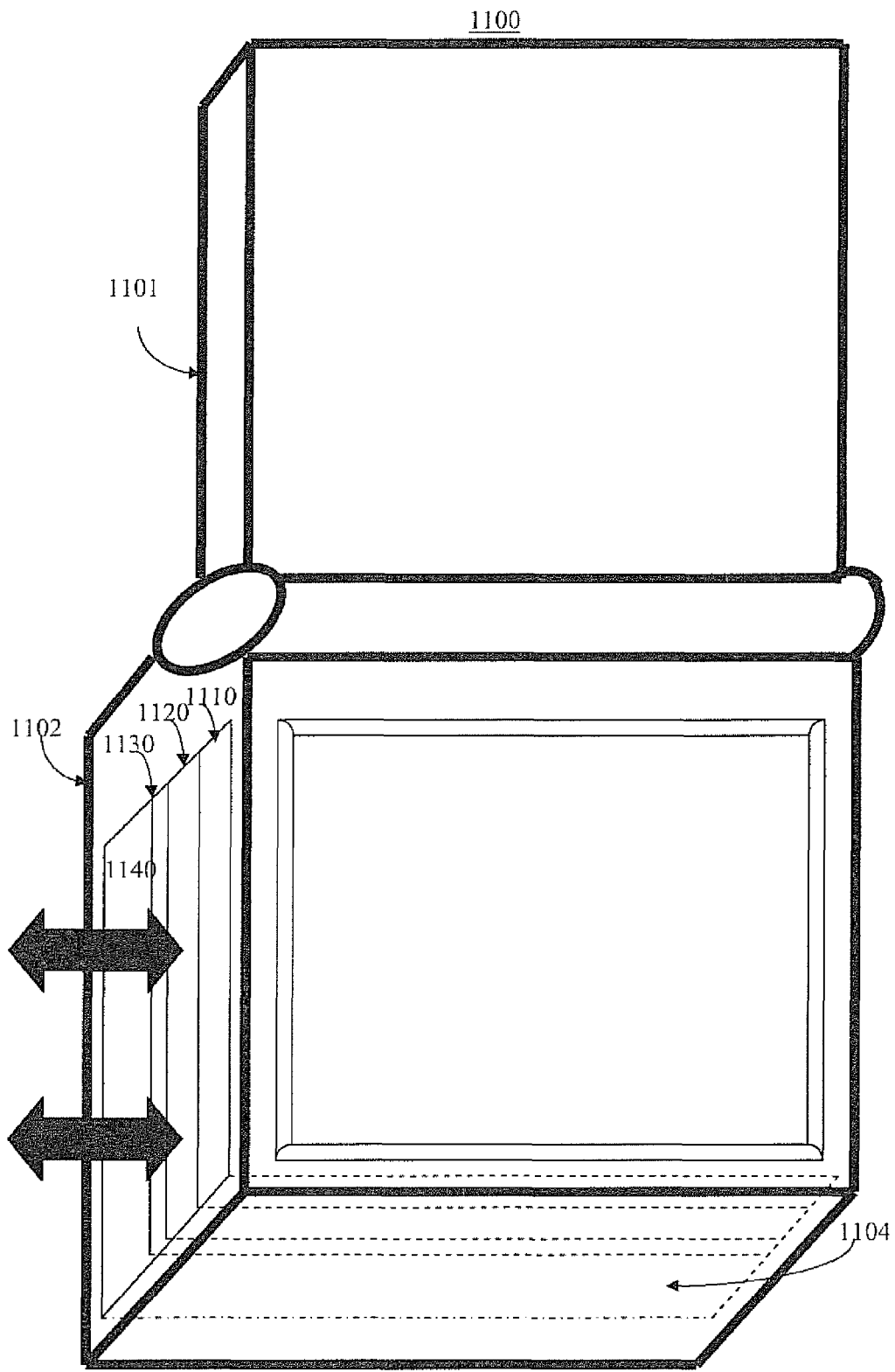
FIG. 13 is a block diagram of an exemplary device with interchangeable layers in accordance with one embodiment of the present invention.

In one embodiment the mechanism layers are independent. The independent mechanism layers can be interchangeable with other respective elevation unit mechanism layers, input surface area layers and elevation control mechanism layers. In one embodiment the independent layers are configured as interchangeable cartridges in a device. FIG. 13 is a block diagram of an exemplary device 1100 with interchangeable layers in accordance with one embodiment of the present invention. Device 1100 includes a lid portion 1101 and a body portion 1102. Body portion 1102 includes interchangeable layers 1110, 1120, 1130, and 1140. In one embodiment, interchangeable layers 1110, 1120, 1130, and 1140 are removable from body 1102 and replaceable with other layers. Any of the layers could potentially be slid out and replaced (as indicated by the double pointing arrow on the left of FIG. 13). One side of the layers is shown "translucently" through side 1104 to convey the layers slide into the device 1100. The layers can include various mechanisms for facilitating surface shape reconfiguration. FIG. 13 shows the layers enlarged for detail, but the layers can be quite thin in one exemplary embodiment.

Figure 14:
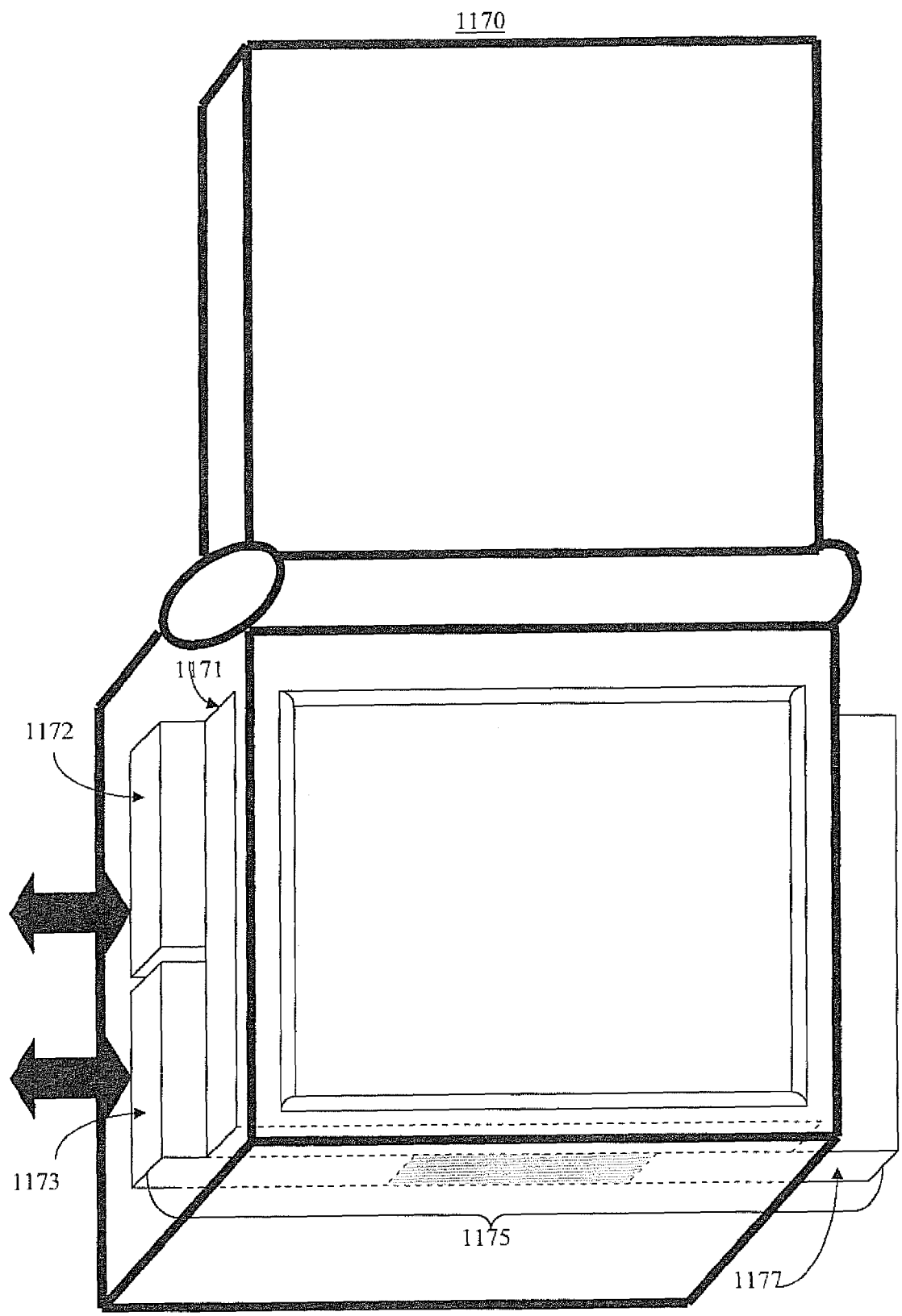
FIG. 14 is a block diagram of an exemplary multi-cartridge implementation in accordance with one embodiment of the present invention.

In addition, a single layer can include a plurality of replaceable cartridges or components. FIG. 14 is a block diagram of an exemplary multi-cartridge implementation 1170 in accordance with one embodiment of the present invention. Multi-cartridge implementation 1170 includes layers 1171 and 1175 which includes cartridges 1172, 1173 and 1177. The cartridges 1172, 1173 and 1177 are shown partially slid out or extracted. The cartridges 1172, 1173 and 1175 are included in the same layer 1175.

Figure 15:
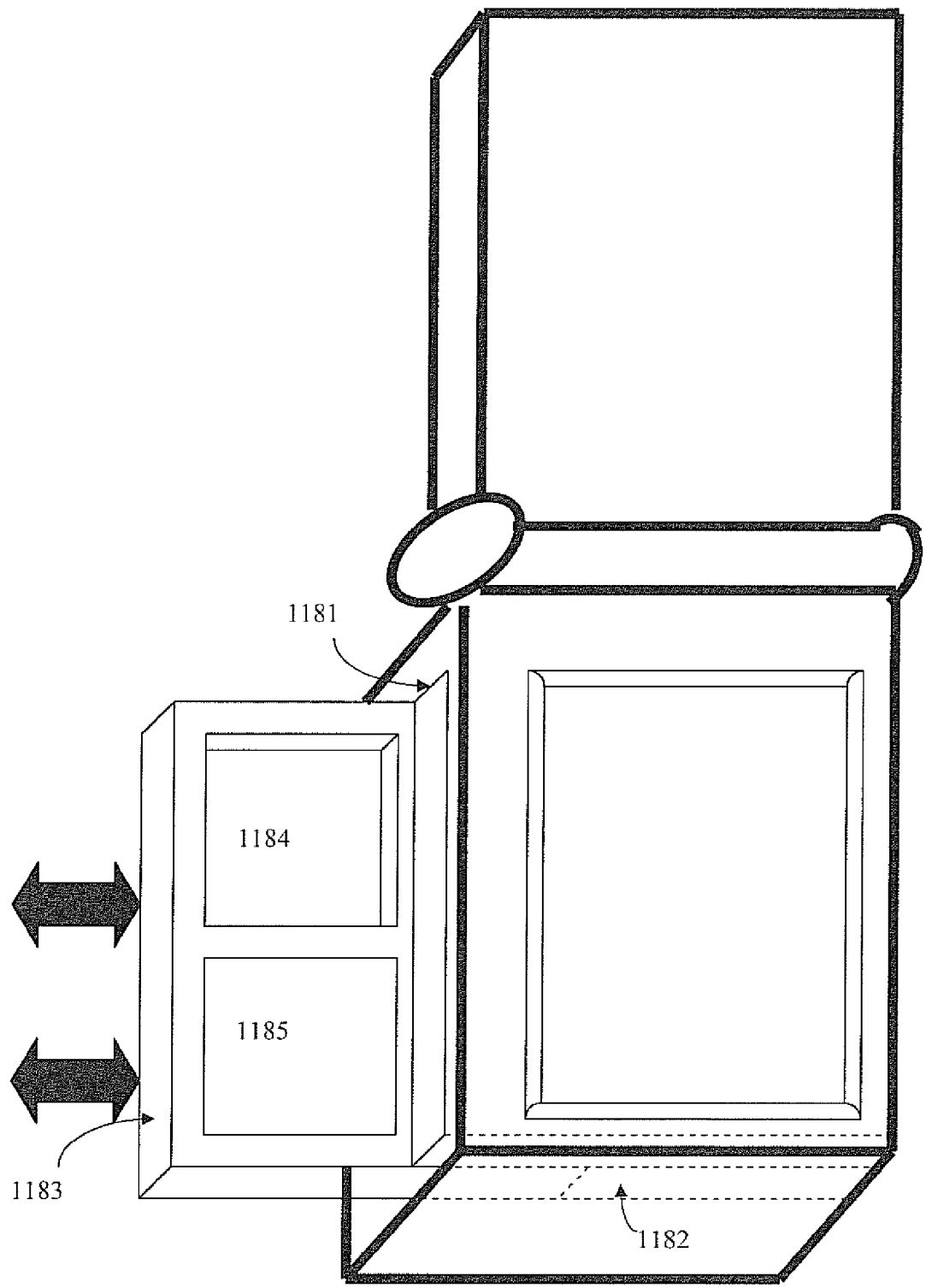
FIG. 15 is a block diagram of another exemplary multi-cartridge implementation in accordance with one embodiment of the present invention.

In one embodiment, a layer has a tray that slides in and out and one or more cartridges can be inserted in the tray. FIG. 15 is a block diagram of another exemplary multi-cartridge implementation 1180 in accordance with one embodiment of the present invention. Multi-cartridge implementation 1180 includes layers 1181 and 1185. Layer 1182 includes a cartridge tray 1183 that slides at least partially out of the body of the device 1180 and provides areas 1184 (e.g., empty) and 1185 (e.g., has a cartridge in it). Mounting area 1185 is shown with a cartridge and mounting area 1184 is shown without a cartridge. In one embodiment cartridge tray 1183 is similar to a compact disc (CD) tray or digit video disk (DVD) tray, in that the tray slides in and out of the device and different cartridges can be mounted or loaded on the tray and then the tray reinserted into the body of the device. Again it is appreciated that a variety of cartridges can be inserted.

Figure 16:
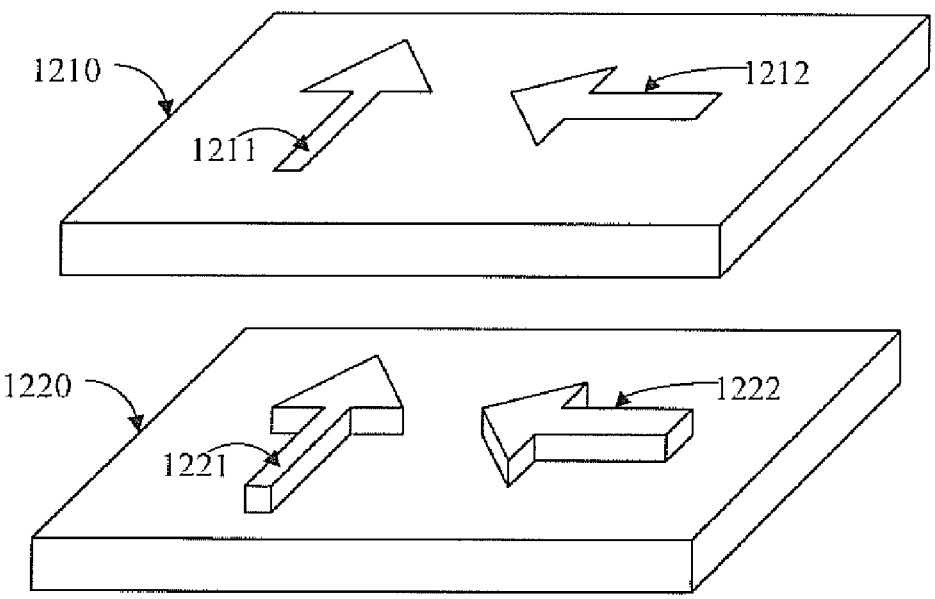
FIG. 16 is a block diagram of an exemplary multi-cartridge implementation in accordance with one embodiment of the present invention.
Figure 17:
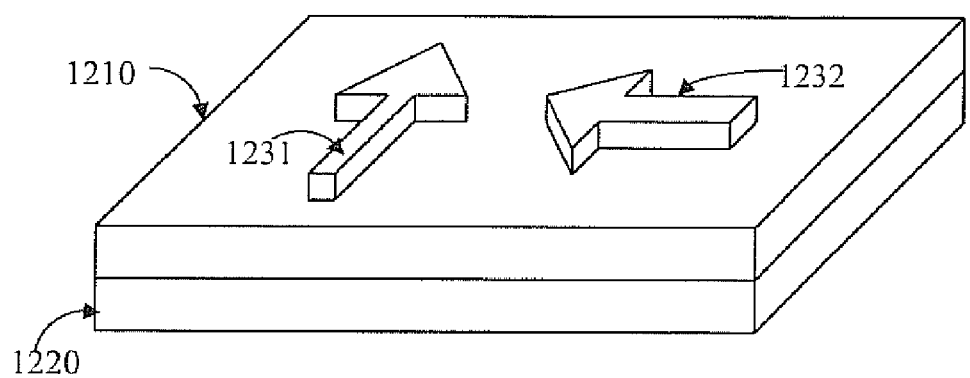
FIG. 17 is a block diagram of an exemplary portion of the surface reconfiguration system with a portion of the layers shown implemented directly on top of one another.

FIG. 16 is a block diagram of an exemplary multi-cartridge implementation 1200 in accordance with one embodiment of the present invention. The multi-cartridge implementation 1200 includes a surface cartridge 1210 and an elevation unit cartridge 1220. Surface cartridge 1220 includes flexible surface with images 1211 and 1212. In one embodiment, the images are permanent (e.g., painted on, engraved, etc.). Elevation unit cartridge 1220 includes elevation unit 1221 and 1222. These are individual elevation units that rise up to form a tactile shape in the flexible surface corresponding to the images 1211 and 1212. The layers are shown separated by a distance but can be implemented directly on top of one another as shown in FIG. 17. When the elevation units 1221 and 1222 rise up they form shapes 1231 and 1232 respectively.

It is appreciated that the present approach facilitates flexible reconfiguration for variety of reasons and also facilitates flexible implementation of a variety of configurations. One benefit of the present embodiment modular aspect of features is a developer (e.g., application developer, device developer, etc.) can design cartridges to work for a variety of different particular device implementations, applications, or configurations. The modular approach facilitates replacement of old or broken components (e.g., rotor/motor packages, stuck elevation units, defective/worn out display screen, etc.). The present approach can also facilitate flexible utilization of future developments. Newly developed pattern cartridges can be added. In one exemplary implementation, an inter-changeable surface cartridge can allow easy implementation as touch surface technologies develop and improve. A user or developer may want a new and better touch surface to be the flexible top surface.

In one embodiment, the pattern controller component is a plate (e.g., metal, plastic, etc.) that has pattern templates formed (e.g., stamped, cut, etc.) in the plate. Due to the relatively inexpensive cost of forming the pattern controller component, this approach allows the user or a developer to cheaply and easily set forth what areas are to rise on the device. In addition, this approach minimizes processing operations that may otherwise be implemented to identify elevation units associated with a shape. The template can be placed on top of the raisable touch surface. Covered areas can be determined through physical pressure or by using the input the device creates on the touchpad.

General Shapes

Figure 18:
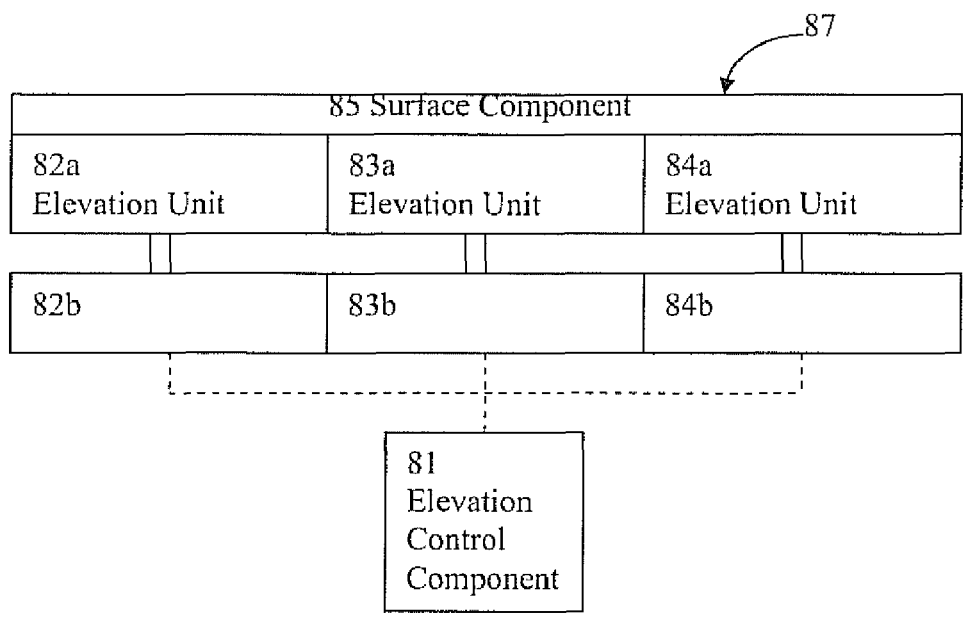
FIG. 18 is a block diagram of exemplary surface reconfiguration system in accordance with one embodiment of the present invention.

FIG. 18 is a block diagram of exemplary surface reconfiguration system 80 in accordance with one embodiment of the present invention. Surface shape reconfiguration system 80 includes elevation control component 81, flexible surface 85, and elevation units 82, 83, and 84. Surface 85 has a selectively variable shape or contour. The components of surface reconfiguration system 80 cooperatively operate to facilitate alterations in the shape or contour of flexible surface 85. Elevation control component 81 controls adjustments to the elevation units 82, 83, and 84. In one embodiment, the elevation units have respective a and b portions (e.g., 82a, 82b, 83a, 83b, 84a and 84b). The elevation units can create alterations in the variable shape of the surface. The surface shape reconfiguration system 80 can also be utilized in an output operation. The surface 85 can include a touch screen display surface.

Figure 19:
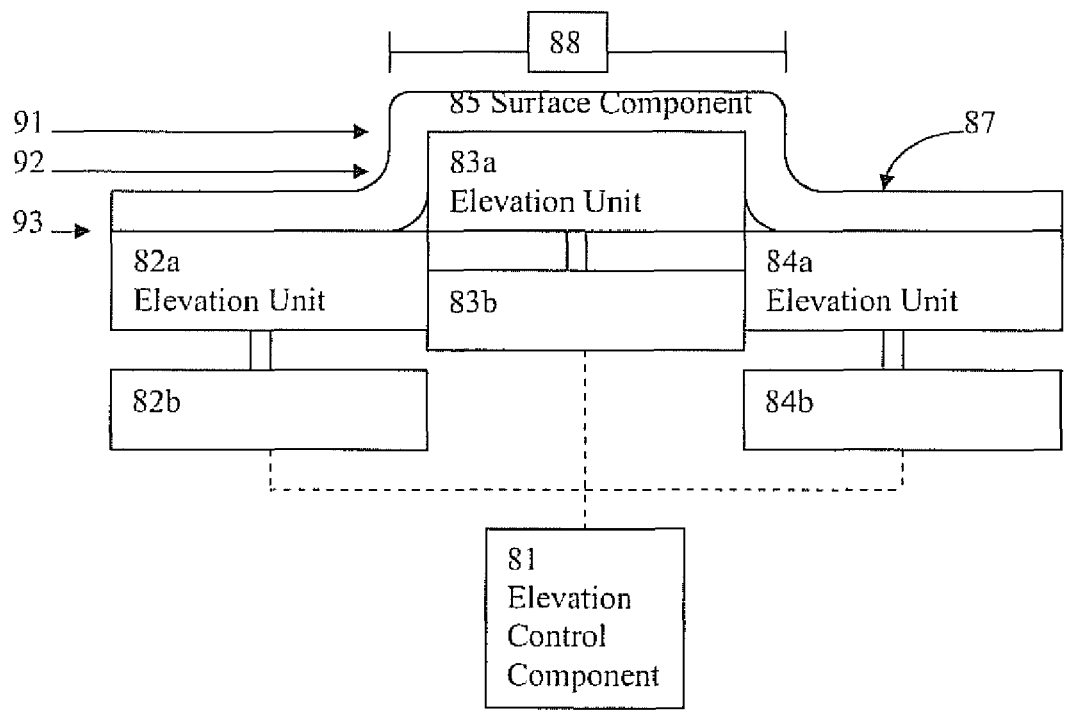
FIG. 19 is a block of surface reconfiguration system with a raised elevation unit in accordance with one embodiment of the present invention.

FIG. 19 is a block of surface shape reconfiguration system 80 with a raised elevation unit 83 to form area 88 in accordance with one embodiment of the present invention.

In one embodiment, the surface reconfiguration system 80 is utilized in an input operation. For example, the elevation unit 83 is associated with an area 88 on the outer surface 87 of surface 85 and the area 88 of the outer surface 87 is associated with an input. The area 88 can also be associated with an output. In one embodiment, the surface is a display surface. In one embodiment, the surface includes touch detection for touch, hover, and gesture inputs. Area 88 of the surface 87 can also be associated with an image. The image can be presented in a variety of manners. It is appreciated that elevation units can create a variety of impacts on the features or characteristics of a surface (e.g., creating surface shapes, topologies,
configurations, layouts, etc.). For example, the elevation or position of an elevation unit with respect to a reference elevation plane can be altered.

In one embodiment, the elevation units 82, 83 and 84 are physically clickable units that include mechanisms for "maintaining" the top portion (e.g., 83a, etc.) position with respect to the bottom portion 83b. For example, the elevation control component 81 raises the elevation unit so that the top of the elevation unit goes from elevation 93 to elevation 91. While the mechanism for raising the elevation unit 83 to elevation 91 and create the raise in surface area 88 is elevation unit 81, the mechanism for "maintaining" the elevation unit at that elevation can be a mechanical mechanism within the elevation unit portions 83a and 83b. For example, the bottom portion 83b remains at a raised elevation while the top portion 83a can be pushed down to elevation 92 by an external force (e.g., a finger, hand, etc.) and a clickable sensation is created. Once the external force is removed, mechanisms (e.g., a spring, lever, mechanism similar to a clickable keyboard button, etc.) can be utilized to return the elevation unit portion 83a to elevation 91.

Figure 20:
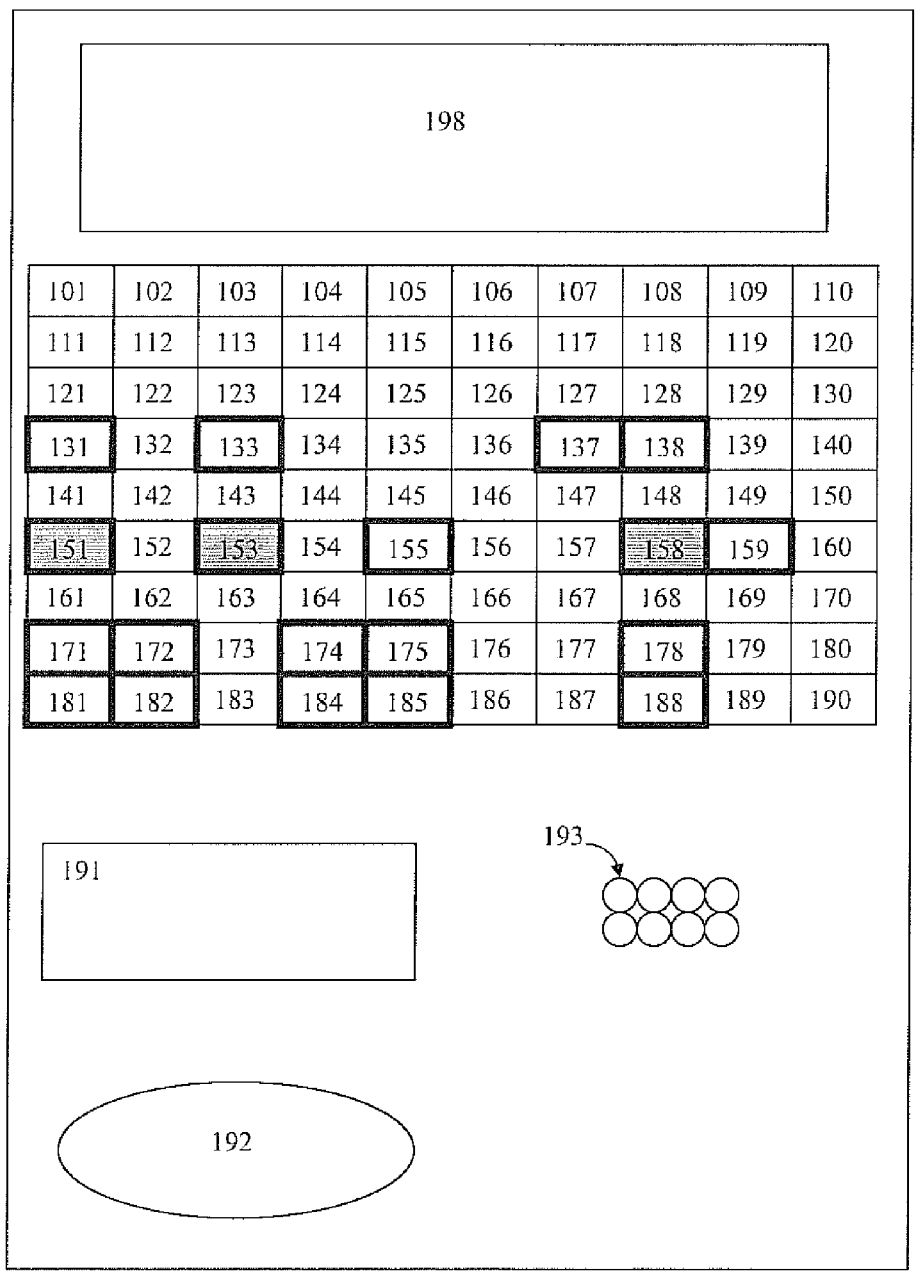
FIG. 20 is a top view block diagram of one exemplary surface reconfiguration system configuration in accordance with one embodiment of the invention.

FIG. 20 is a top view block diagram of one exemplary surface reconfiguration system configuration 100 in accordance with one embodiment of the invention. Surface shape reconfiguration system 100 includes elevation units 101 through 193. It is appreciated that a reconfigurable surface system can have non-active areas or areas that do not have reconfigurable surface shape areas, for example area 198. Area 198 can have touch or other types of input and output, but does not raise and lower in elevation in the embodiment of FIG. 20. In one exemplary implementation, elevation units 131, 133, 137, 138, 155, 159, 171, 172, 174, 175, 178, 181, 182, 184, 185, and 188 are raised and elevation components 151, 153 and 158 are lowered. Elevation units 191, 192, and 193 show that the elevation units can be composed of many shapes and sizes. This can depend on the purpose for the device as well as the ruggedness needed in the practical environment the device will be located in.

Figure 21:
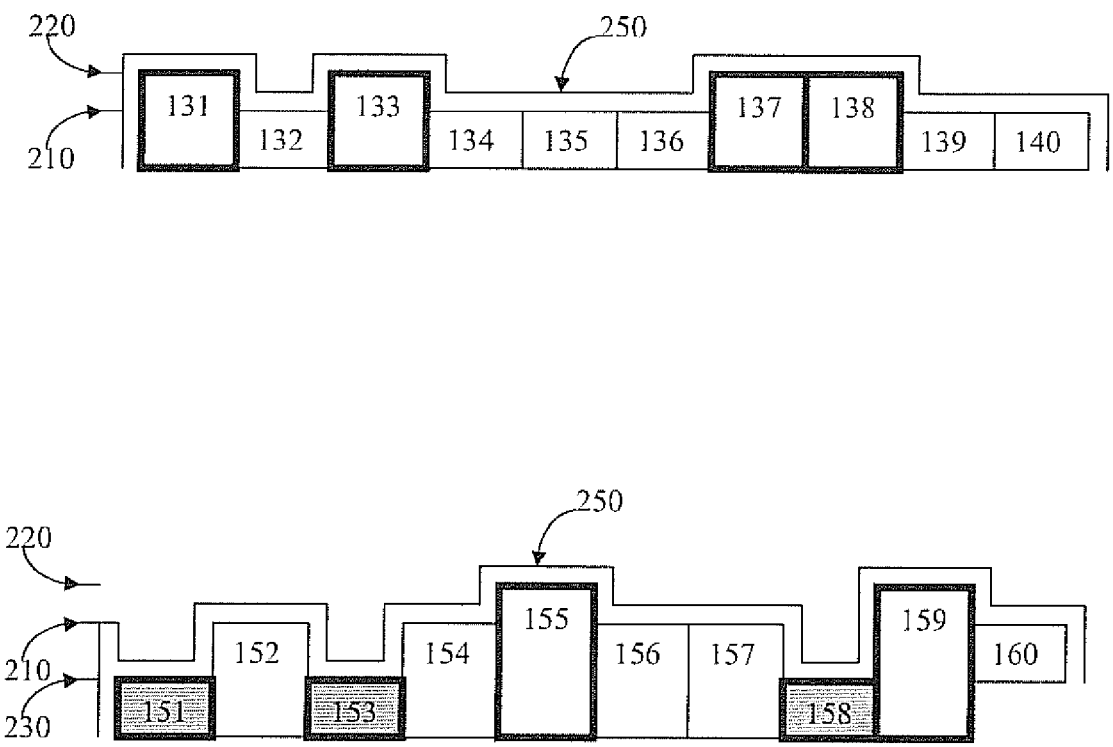
FIG. 21 is a side view of the elevation units at an elevation that is raised or higher with respect to a reference elevation plane and elevation units at an elevation that is lower with respect to the reference elevation plane.

FIG. 21 contains two side views of a reconfigurable surface component 250 with alterations corresponding to elevation units 131 through 140 and 151 through 160. FIG. 21 is a side view of the elevation units 131, 133, 137, 138, 155, and 159 at elevation 220 that is raised or higher with respect to a reference elevation plane 210 and elevation units 151, 153 and 158 at elevation 230 that are lower with respect to the reference elevation plane 210.

Figure 22:
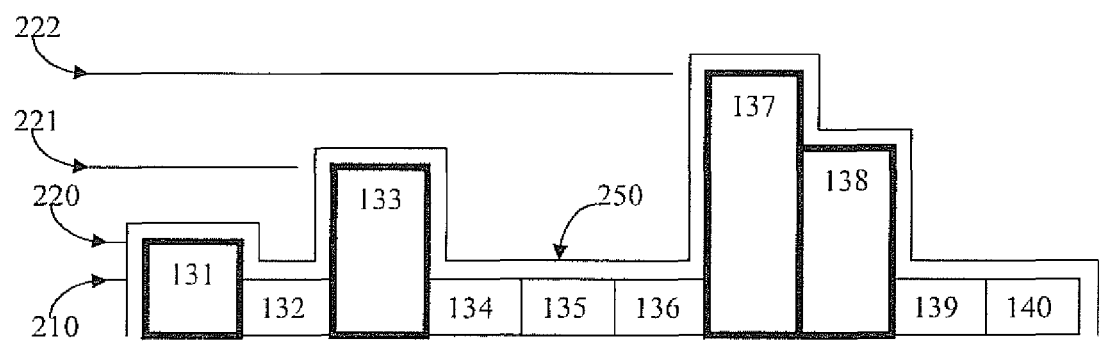
FIG. 22 is a block diagram of elevation units raised to a variety of elevations that vary in elevation from reference elevation plane.
Figure 23:
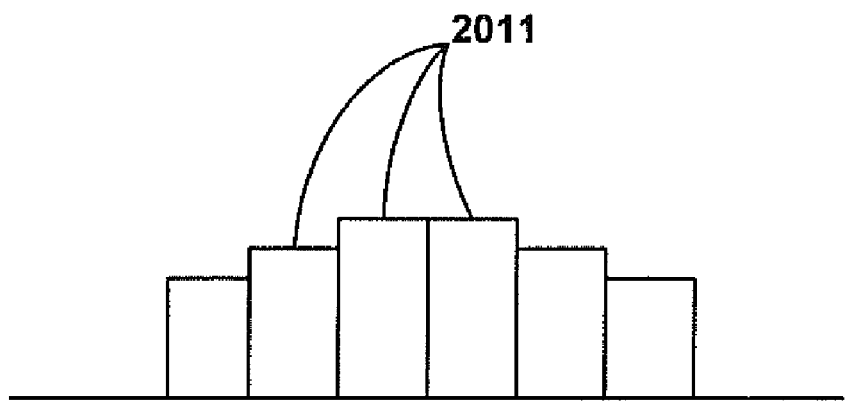
FIG. 23 is a block diagram of another elevation configuration pattern of elevation units with respect to a reference elevation plane in accordance with one embodiment of the present invention.

Elevation changes can be variable. FIG. 22 is a block diagram of elevation units 131 through 140 raised to a variety of elevations including elevation planes 220, 221 and 222 that vary in elevation from reference elevation plane 210. There could also be a combination of raised and lowered elevations. FIG. 23 is a block diagram of another elevation configuration pattern of elevation units (e.g., shown typically as 2011) with respect to a reference elevation plane in accordance with one embodiment of the present invention.

Figure 24:
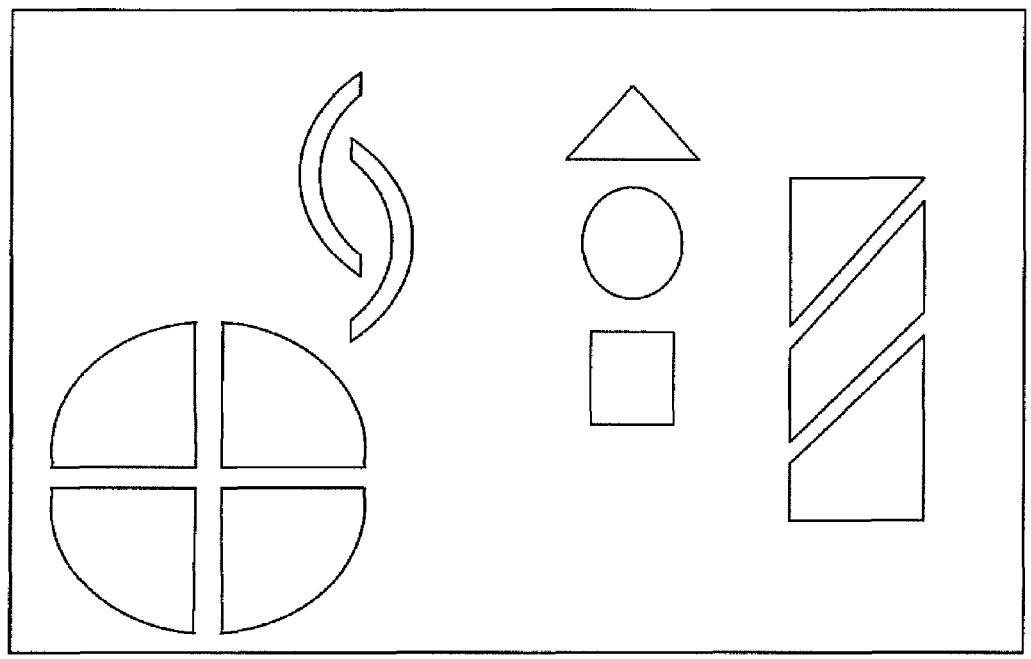
FIG. 24 is a block diagram of exemplary different shapes that can be created by elevation units in accordance with one embodiment of the present invention.

A variety of shapes can be created in a surface. FIG. 24 is a block diagram of exemplary different shapes that can be created by elevation units in accordance with one embodiment of the present invention. Again is appreciated that individual elevation units can have these shapes and the shapes can be created by a coordinated alteration of a plurality of elevation units. The size of an elevation unit itself can vary over a wide range (e.g., a size similar to a key on a standard-size computer keyboard, a size similar to a point or head of a needle, size of a car steering wheel, etc.). Shapes can also be created within shapes using elevation units raised to different elevation heights (e.g. a triangle within a square, an arrow within a circle, etc). In one embodiment, this method is used to label and assign a value to a key instead of a display.

Figure 25:
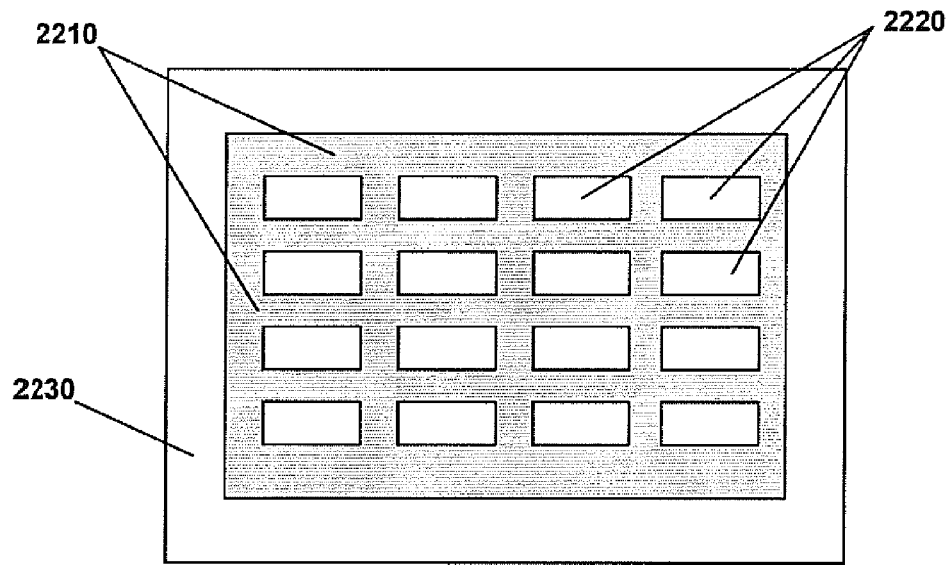
FIG. 25 is a top view block diagram of exemplary outlines of a shape or an area in accordance with one embodiment of the present invention.
Figure 26:
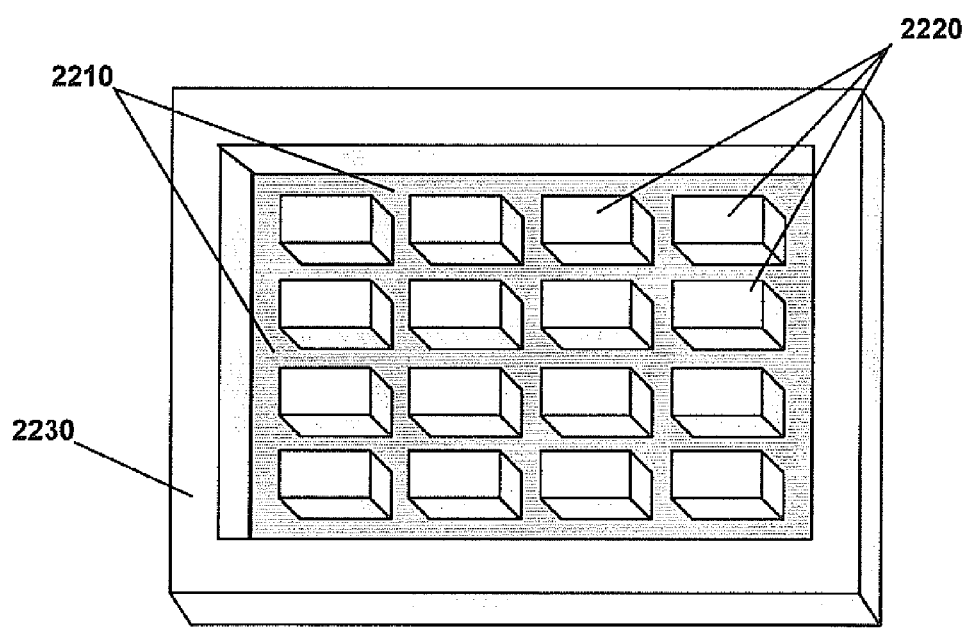
FIG. 26 is a corresponding three dimensional view block diagram of exemplary outlines of a shape or an area in accordance with one embodiment of the present invention.

Elevation units can also be lowered or raised to create an outline of a shape or an area. FIG. 25 is a top view block diagram of exemplary outlines of a shape or an area in accordance with one embodiment of the present invention. For example, outlines typically shown as 2210 create outlines of shapes or areas typically shown as 2220. FIG. 26 is a corresponding three dimensional view block diagram of exemplary outlines of a shape or an area in accordance with one embodiment of the present invention. It is appreciated that the outlines can be utilized to create a variety of shapes (e.g., symmetrical, asymmetrical, shapes similar to those in other FIGS. 17 through 19, etc.).

Figure 27:
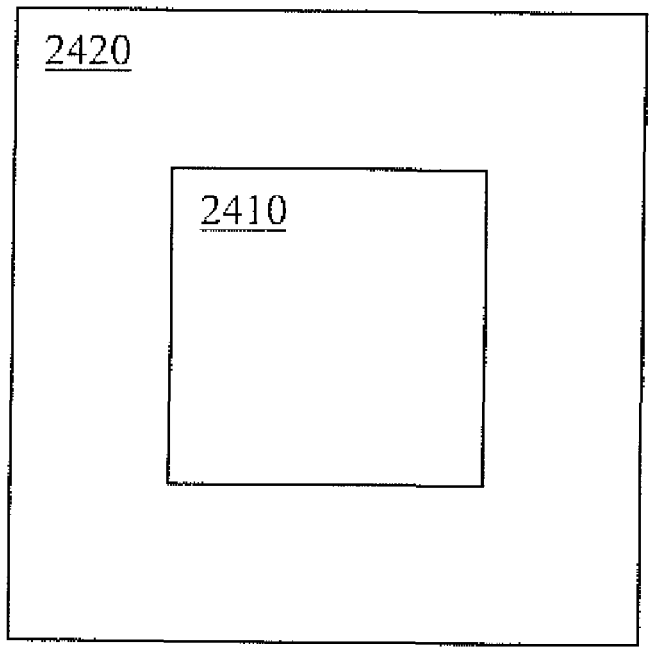
FIG. 27 is a block diagram of an exemplary concentric square reconfigurable surface implementation in accordance with one embodiment of the present invention.
Figure 28:
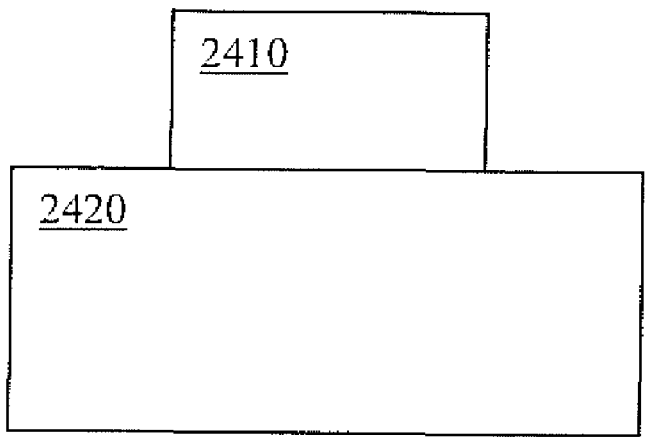
FIG. 28 is a side view of an exemplary concentric square reconfigurable surface implementation in accordance with one embodiment of the present invention.

The elevation units can be configured to produce a concentric contour or shape. FIG. 27 is a block diagram of an exemplary concentric square reconfigurable surface implementation in accordance with one embodiment of the present invention. FIG. 28 is a side view of an exemplary concentric square reconfigurable surface shape implementation in accordance with one embodiment of the present invention. 2410 is a single elevation unit or a combination of multiple elevation units that are concentrically inside 2420, which also could be a single elevation unit or multiple.

Figure 29:
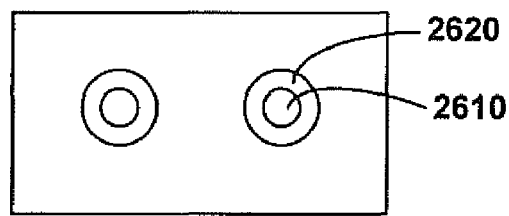
FIG. 29 is a top view of an exemplary concentric circular reconfigurable surface implementation in accordance with one embodiment of the present invention.
Figure 30:
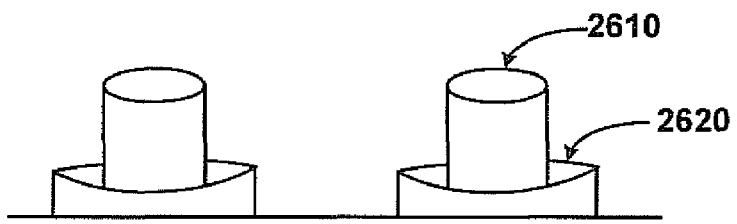
FIG. 30 is a side view of an exemplary concentric circular reconfigurable surface implementation in accordance with one embodiment of the present invention.

FIG. 29 is a top view of an exemplary concentric circular reconfigurable surface implementation in accordance with one embodiment of the present invention. FIG. 30 is a side view of an exemplary concentric circular reconfigurable surface implementation in accordance with one embodiment of the present invention. 2610 is a single elevation unit or a combination of multiple elevation units that are concentrically inside 2620, which also could be a single elevation unit or multiple. In one embodiment, the inner elevation shape (e.g., 2410, 2610, etc.) can be higher or lower than the respective outer elevation shape (e.g., 2420, 2620, etc.) or vise versa. In one embodiment, the configuration can be utilized for a joystick-like implementation or application. In the joystick-like implementation, the elevation units not only detect a click, press, tap, hover, gesture, and touch, but also an angle of pressure on the highest key created by one or multiple elevation units (e.g. 2610).

Figure 31:
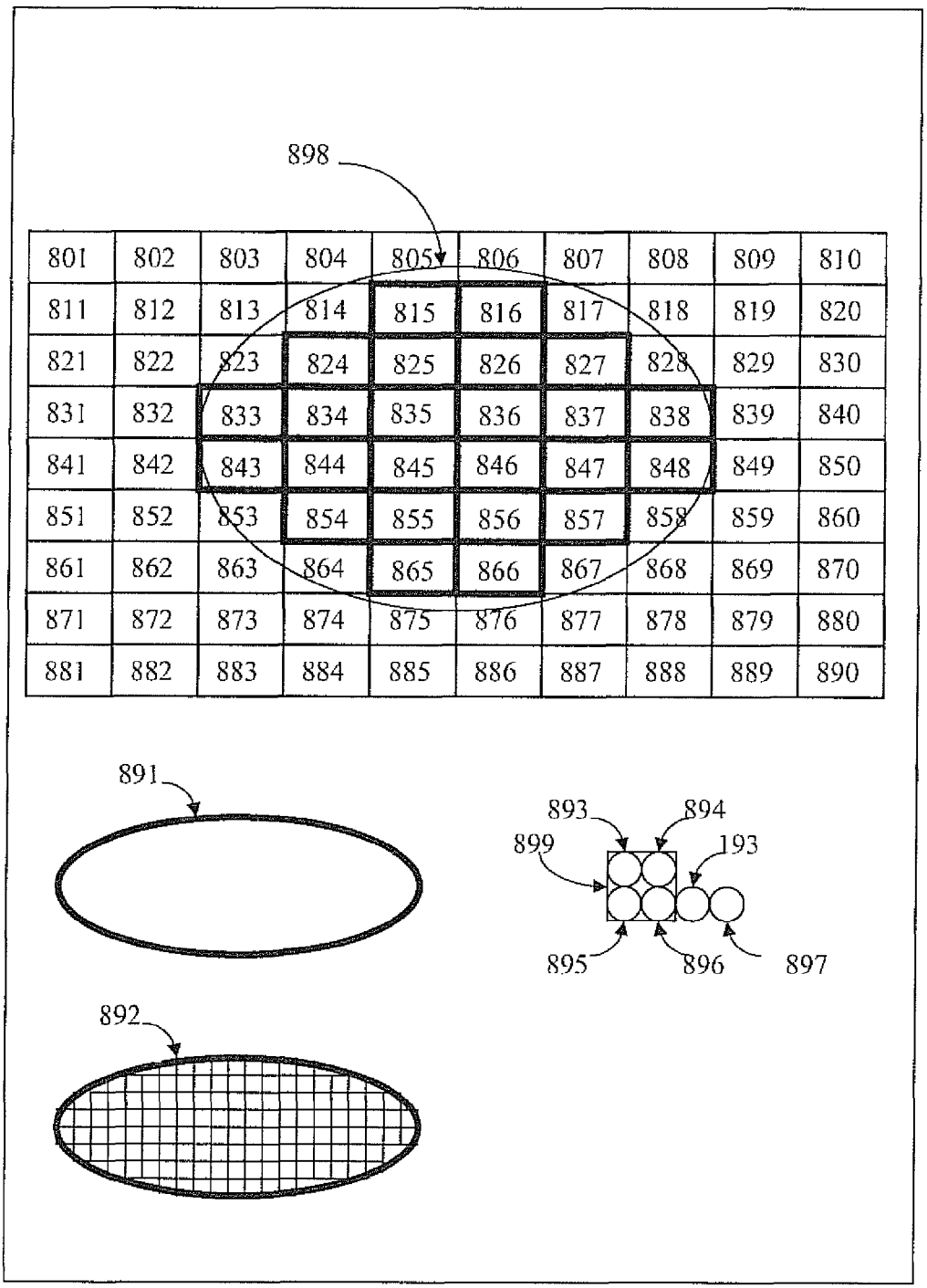
FIG. 31 is block diagram of an exemplary implementation in which elevation units are utilized to create a circular shaped alteration in reconfigurable surface.

The shape of the alteration in a surface can be the result of the shape of the elevation unit itself and the shape can also be the result of coordinated alterations in a plurality of elevation units. For example, the shape of the alteration in the reconfigurable surface can be circular. FIG. 31 is block diagram of an exemplary implementation in which elevation units are utilized to create a circular shaped alteration 898 in reconfigurable surface. For example, the circular surface shape can be the result of individual elevation units that are circular themselves (e.g., elevation units 893 though 897, elevation unit 891) being raised or lowered. For example, circular elevation unit 891 is a single elevation unit that can be raised to create a circular surface shape. The circular shape can be the result of coordinated alterations in a plurality of elevation units utilized to create a circular shaped alteration in the reconfigurable surface. For example, the plurality of elevation units 815, 816, 824 through 827, 833 through 838, 843 through 848, 854 through 857 and 865 and 866 are raised to create a general circular shape 898. A plurality of elevation units can also be raised to create a circular pattern 892. The circular elevation units can be used to create other patterns. In one exemplary implementation, raising of the circular elevation units can form a square surface pattern or shape. For example, circular elevation units 893, 894, 895 and 896 can be raised to form a square surface shape 899.

The shapes created by the elevation units can have a 3 dimensional nature. The references above to elevation units forming a square shape can be readily implemented to form a cube shape or the circular shapes for a cylinder.

Figure 32:
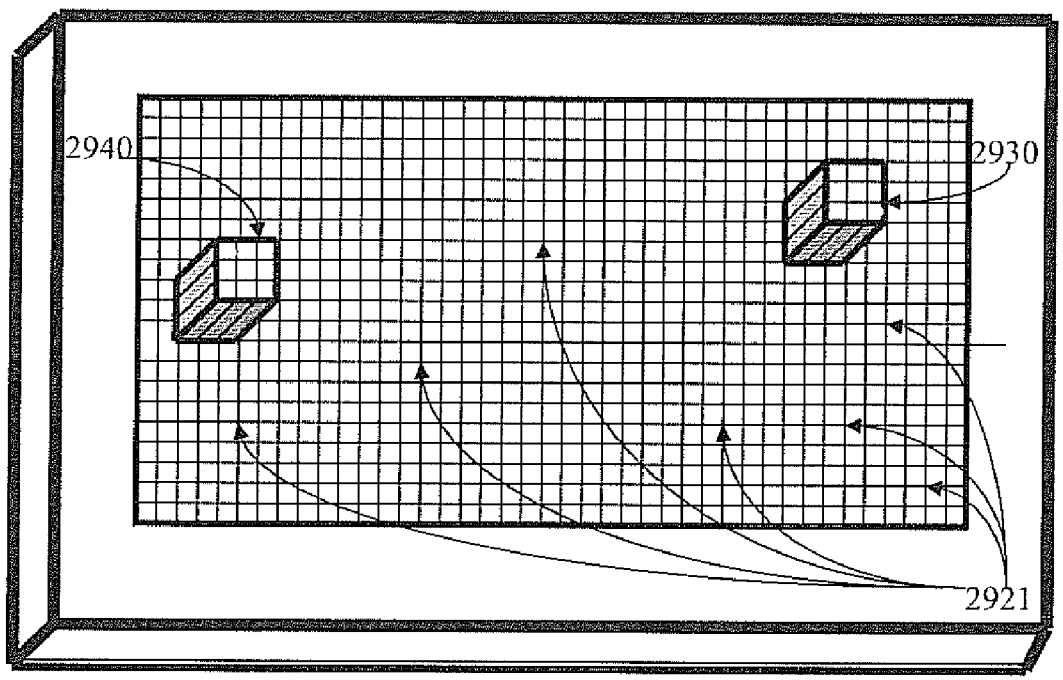
FIG. 32 is a block diagram of an exemplary matrix of elevation units which alter a surface shape in accordance with one embodiment of the present invention.
Figure 33:
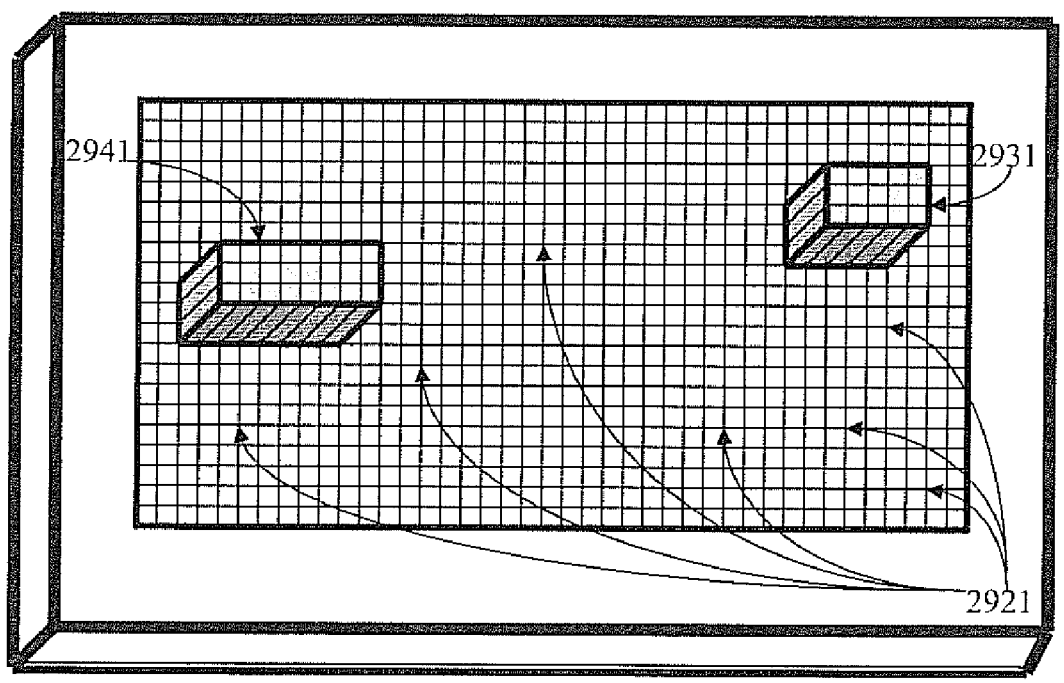
FIG. 33 is a block diagram of an exemplary rectangle surface shape formed by adding raised elevation units to square surface shape in accordance with one embodiment of the present invention.

Changes to elevation units can be coordinated to change a surface area shape. For example, additional elevation units can be added or subtracted from a shape. FIG. 32 is a block diagram of an exemplary matrix of elevation units 2921 which alter a surface shape or contour. In one embodiment, the elevation matrix is similar to the elevation matrix included in reconfigurable surface areas of electronic device 100. The shape 2940 and 2930 are square shapes formed by elevation units shown typically as 2921. The shape 2940 can be changed into a rectangle shape by raising or lowering additional elevation units. FIG. 33 is a block diagram of an exemplary rectangle surface shapes 2931 and 2941 formed by adding raised elevation units to square surface shapes 2930 and 2940 in accordance with one embodiment of the present invention.

Shape Definition

In one embodiment, surface shape parameters or definition are automatically received or retrieved. In one exemplary implementation, a surface shape definition is automatically received from an active application. For example, surface shape information (e.g., the size, location, height, etc.) can be automatically received from an active gaming application. The information can also include information associating a surface shape with an input or output.

In one embodiment, a surface shape query process is performed. The surface shape query process can include requesting information from a variety of sources (e.g., an application, an activity monitoring mechanism, etc.). In one embodiment, the elevation determination process includes receiving an indication of surface area shape. A surface shape query process can be included in a surface shape determination process (e.g., similar to surface shape determination process of block 410 in FIG. 4, etc.).

Figure 34:
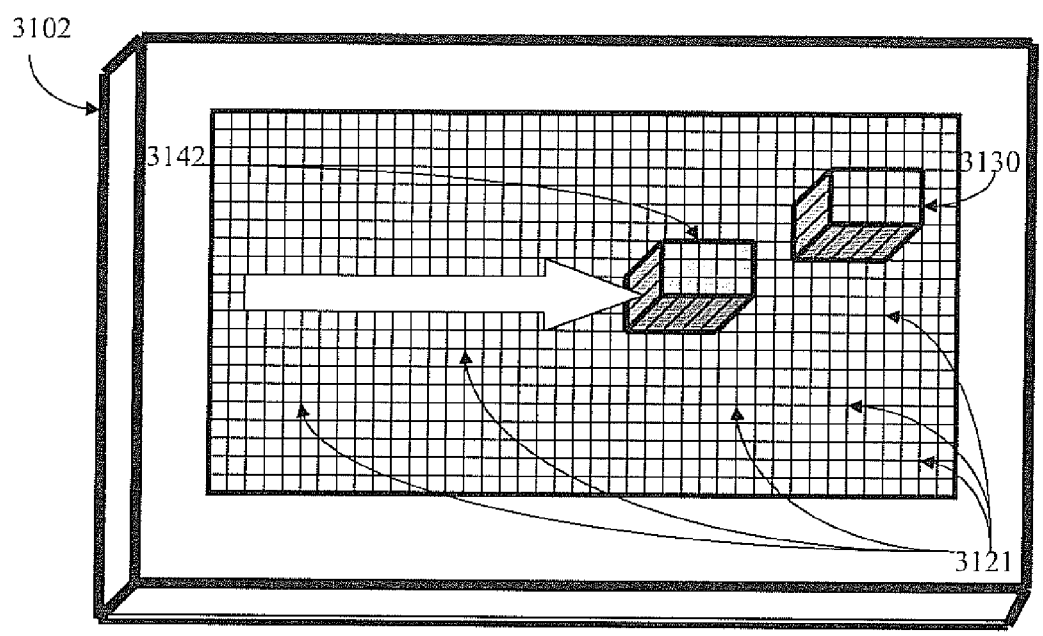
FIG. 34 shows a user reconfigurable system where the user can push on a side of a raised surface shape to move the location of the surface shape.

In one embodiment, a device can be put in a configuration mode and touches on surface areas are utilized to determine surface shape (e.g., round, square, rectangle, etc.) and the surface shape size (e.g., height, width, length, etc.) and location (e.g., middle of a device, close to edge of a device, certain distance from edge of a device, etc.). With reference again to FIGS. 32 and 33, in one embodiment, when in configuration mode a user interacts (e.g., taps, touches, etc.) with surface shape 2940 and the surface shape 2940 is increased or enlarged surface shape 2941. FIG. 34 shows a user reconfigurable system where the user can push or tap on a side of a surface shape 3142 to move the location of the surface shape. For example, a surface shape 3142 is created by elevation units 2131 initially closer to the left hand side (e.g., similar to surface shape 2941) of a device 3102 but is moved closer to the right hand side and surface shape 3130. The touch detection technology in the embodiment recognizes touches on all sides of the raised key that are accessible to the user, including the sides. In addition, touching the top of a surface shape when the device is in reconfiguration mode might indicate to lower the surface shape, while touching the surface where a surface shape is not present might indicate to raise a surface shape in that location.

Figure 35:
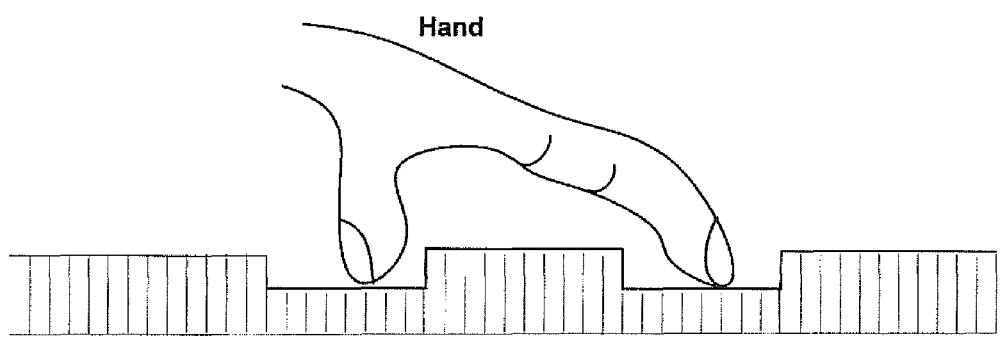
FIG. 35 shows a user reconfigurable system where the user can push down on areas of the device.

FIG. 35 shows a user reconfigurable system where the user can physically push down on areas of the device. These can become temporarily lowered areas in situations where the device is set to respond in this way. In one embodiment, the areas pushed down become raised areas when the user takes the finger(s) away.

Figure 36:
FIG. 36 is a block diagram indicting the raised areas after the fingers are removed.

FIG. 36 is a block diagram indicating the raised areas after the fingers are removed. This creates nominally lowered areas and raised areas when the device returns to normal mode. This allows a user to select areas to be raised and lowered without entering into any menus of an electronic device or system. Thus, the implementation can be used in situations where no display is needed; a user relies on the output the elevation unit surface provides. For example, a remote control for a television or changing of controls on a steering wheel.

In one exemplary implementation, touching, hovering, or gesturing a side of a surface shape can make the key move the opposite direction (lowering near elevation units and raising opposing elevation units). Swiping a certain direction on the top of the surface shape can have the same effect.

Figure 37:
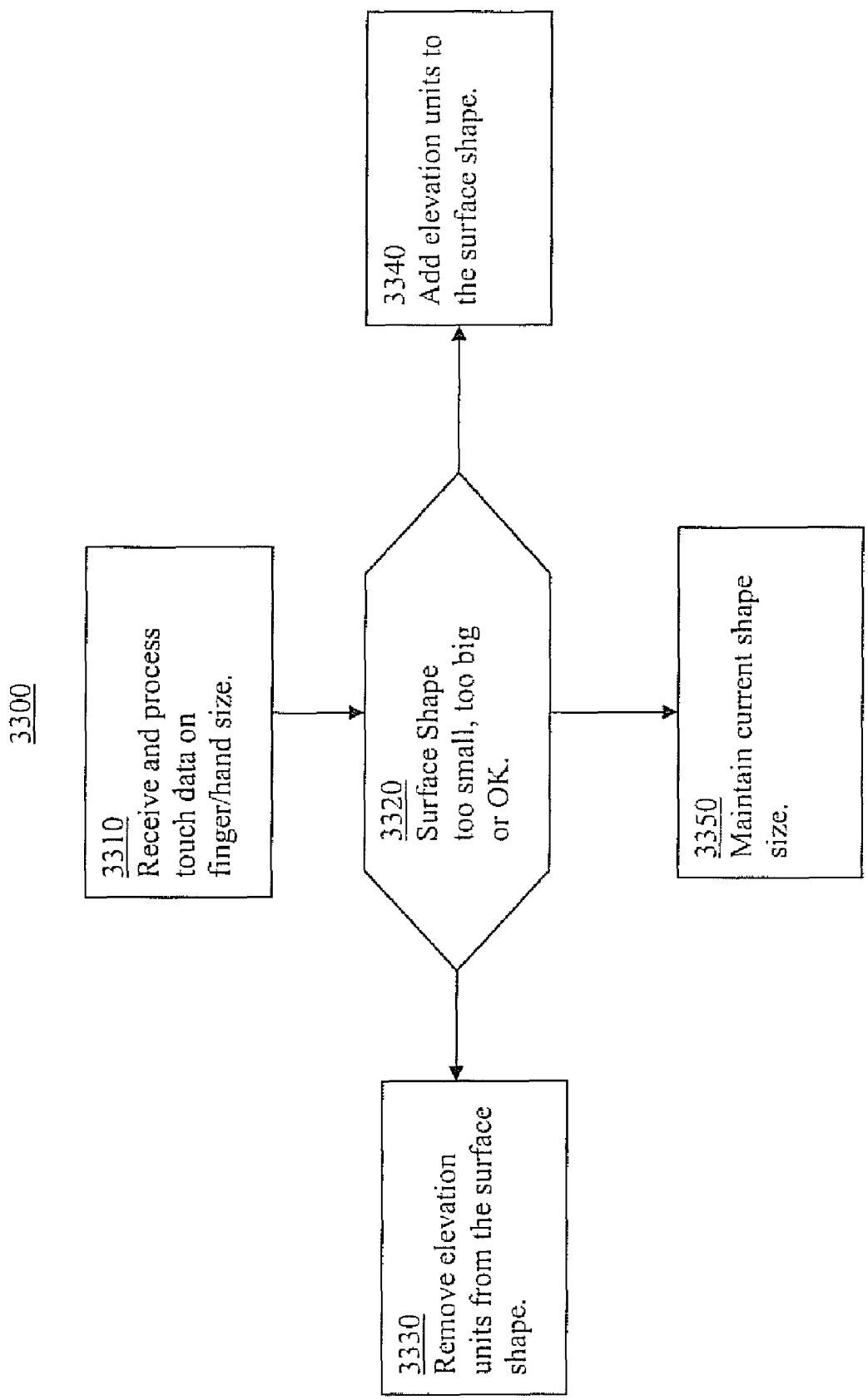
FIG. 37 is a flow chart of a surface shape reconfiguring process in accordance with one embodiment of the present invention.

Intelligent reconfiguring of the surface shape is based on how the device and surface shape has been or will be used by a user. FIG. 37 is a flow chart of a surface shape reconfiguring process 3300 in accordance with one embodiment of the present invention. A reconfiguring process can have the ability for the device to detect finger/hand size and adjust the surface shape size in relation thereto. In block 3310 information on the finger/hand size is received and processed. More or fewer elevation units are used for the surface shape after the detection of finger size is completed by the touch surface. In block 3320 a decision is made if the surface shape size is to big, to small or OK. If the surface shape size is too big, the process proceeds to block 3330 and particular elevation units are removed from the surface shape configuration. If the surface shape size is to small the process proceeds to block 3340 and elevation units are added to the surface shape configuration. If the surface shape size is OK the process proceeds to block 3350 and elevation units are maintained in the surface shape configuration. This is very useful for many people. Current surface shape implementations, especially on mobile devices, are generally tiny with respect the size of each surface shape. Finger size detection can be done via the touch surface or by some other method.

In one embodiment, a part of a surface shape that is most pressed is detected. This, and other input tests, indicates to the device in what ways the device is held and used that is comfortable to the user. The device can then present reconfigured key options to adapt to that comfort zone. For example, the particular elevation units raised or lowered can also be based on where the user has preferred in the past to touch the surface shape/key. Using that information, the system can adjust the now larger or smaller key based on perceived user preferences. Or, keys can be moved towards the edges of the device for users with smaller hands who are having difficulty reaching the center of the device. The reconfigurability of the system allows for a smaller device footprint, thus making reconfigurable keyboards easy on smaller systems.

If a user manually creates a raised key configuration as described above, the system can remember that implementation for the next use of the device. The system can also remember the user's preferred layout based on the particular use case. For example, the touchpad can receive the user's fingerprint. Based on the specific user identified and the game being played or application being used, the device will reconfigure to a state the user selected the last time the user played the game or used the application.

The device can also detect a one-handed use, hand shifts, or device rotations. In these circumstances the device can ask the user if they would like the device to reconfigure. Alternatively, the device can reconfigure automatically.

In one embodiment, a configuration mode can also be utilized to establish active and inactive areas. In one exemplary implementation, a user taps certain areas a certain number of times or for a certain number of seconds to tell the device which areas are to be active touch and which are to be inactive touch. This interface customization can be enjoyable for the user as it gives them a tactile feel and creative outlet. Each user's device can thus be designed differently. In one embodiment, the top flexible surface can change colors (e.g., is a display, LEDs, or otherwise change colors) and the user can have even more customizable options.

Figure 38:
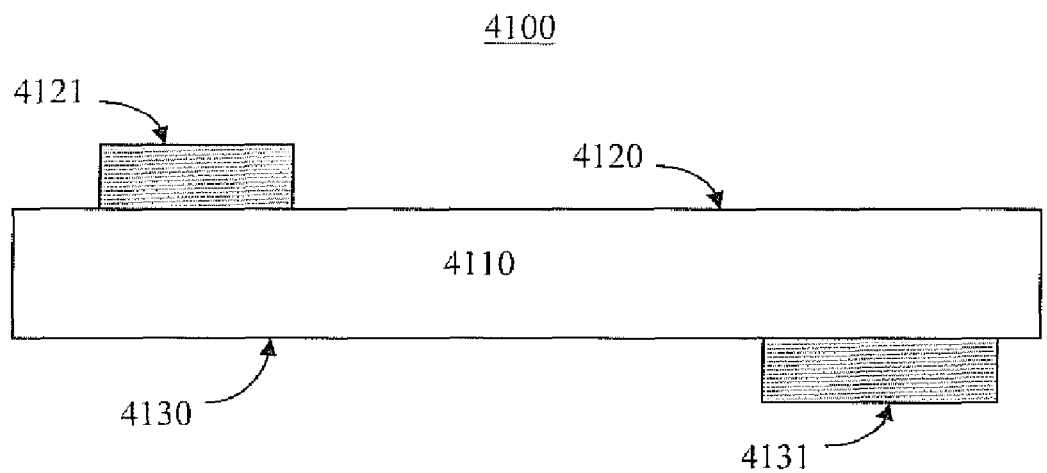
FIG. 38 is a block diagram of an exemplary device with a device body that has a top reconfigurable surface and a reconfigurable bottom surface in accordance with one embodiment of the present invention.
Figure 39:
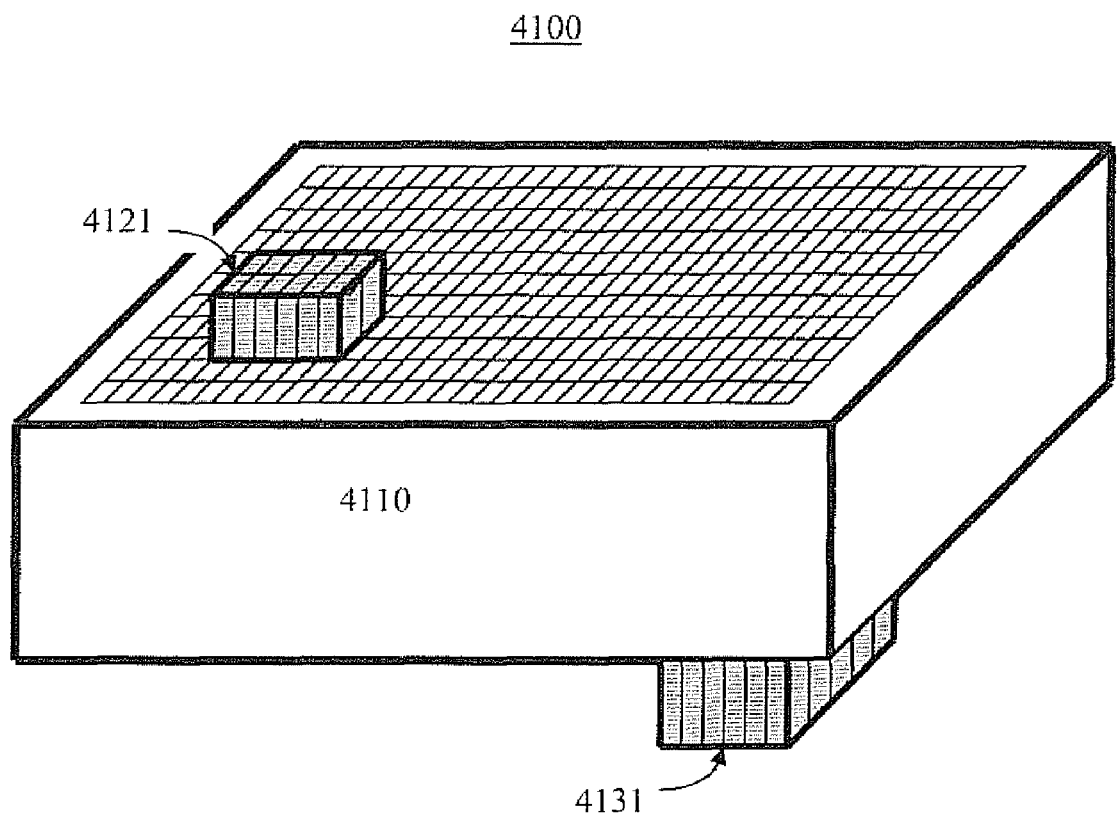
FIG. 39 is a block diagram perspective view of elevation units of an exemplary device in accordance with one embodiment of the present invention.

Reconfigurable surfaces can be included on various surfaces (e.g. top, bottom, side, etc.) of a device. FIG. 38 is a block diagram of exemplary device 4100 with a device body 4110 that has a top reconfigurable surface 4120 on top of the device and a reconfigurable bottom surface 4130 on bottom of the device in accordance with one embodiment of the present invention. A surface shape 4121 is formed in top reconfigurable surface 4120 and a surface shape 4131 is formed in the bottom reconfigurable surface 4130. FIG. 39 is a block diagram three-dimensional perspective view of elevation units of exemplary device 4100 in accordance with one embodiment of the present invention.

Figure 40:
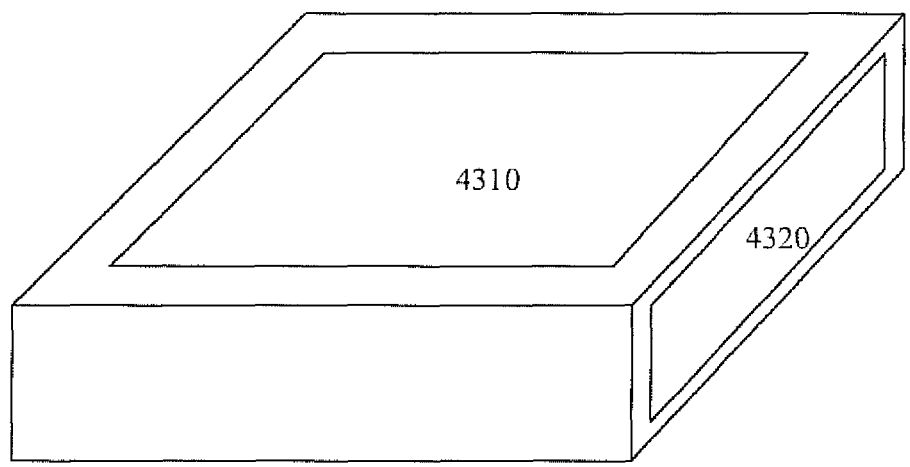
FIG. 40 is a block diagram bottom view of exemplary device with a bottom reconfigurable surface area and a reconfigurable side surface in accordance with one embodiment of the present invention.
Figure 41:
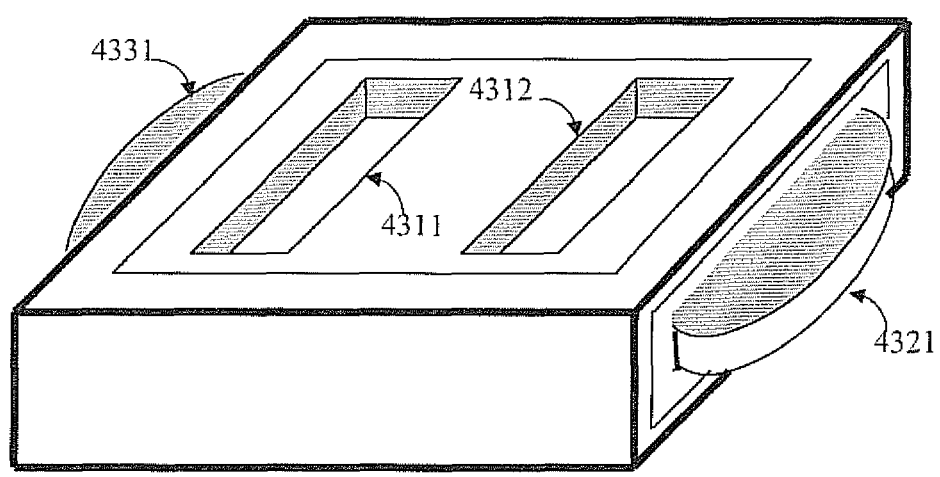
FIG. 41 is a block diagram perspective view of exemplary surface shapes created in the device in accordance with one embodiment of the present invention.

FIG. 40 is a block diagram bottom view of exemplary device 4300 with a bottom reconfigurable surface area 4310 on bottom of the device and a reconfigurable side surface 4320 on a side of the device in accordance with one embodiment of the present invention. In FIG. 4300 no surface shapes are created. FIG. 41 is a block diagram perspective view of exemplary surface shapes created in device 4300 in accordance with one embodiment of the present invention. Bottom grip surface shapes 4311 and 4312 are created and side grip surface shapes 4321 and 4331 are also created by raising and lowering particular elevation units on the surfaces.

Figure 42:
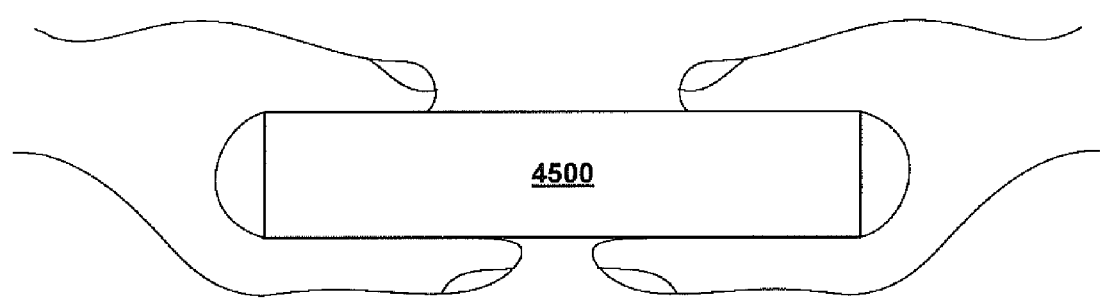
FIG. 42 is a block diagram side view of exemplary device without surface shapes in accordance with one embodiment of the present invention.
Figure 43:
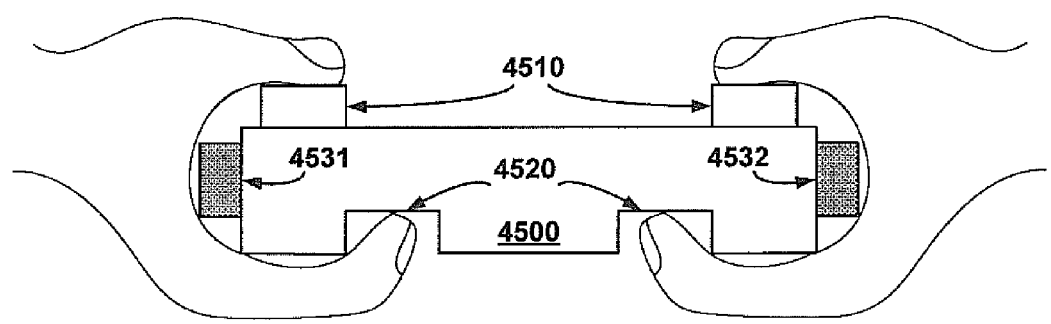
FIG. 43 is a block diagram side view of exemplary device with surface shapes in accordance with one embodiment of the present invention.

FIG. 42 is a block diagram side view of exemplary device 4500 without surface shapes in accordance with one embodiment of the present invention. As illustrated in the FIG. 42 there is no tactile differentiation on the surfaces of device 4500. FIG. 43 is a block diagram side view of exemplary device 4500 with surface shapes in accordance with one embodiment of the present invention. The surface shapes include top surface shapes 4510, bottom surface shapes 4520 and side surface shapes 4531 and 4532. Top surface shapes 4510 can be utilized as input components (e.g., keys, buttons, etc.). Bottom surface shapes 4520 can be utilized as grip enhancing features. Side surface shapes 4531 and 4532 can also be utilized as grip enhancing features and input components.

Input Features

A surface reconfiguration system can be implemented with a variety of sensing mechanisms and configurations for sensing input. In one embodiment, the input sensing mechanisms can be included in the elevation unit mechanisms. In one exemplary implementation, the input sensing mechanism is included in the elevation units and the sensing mechanism senses interaction (e.g., force, manipulation, etc.) with the elevation unit. For example, similar to a key or button on a key pad, the sensing mechanism of an elevation unit can sense when force is applied to the elevation unit by something other than the elevation unit control component. One way for sensing force is by using a clickable key mechanism built into the elevation units. While the following sensing mechanisms are described in terms of a surface area forming a key, it is appreciated the sensing mechanisms can be implemented with a variety of input components (e.g. joystick, etc.).

It is appreciated that the input sensing mechanisms can be "separated" from the elevation unit mechanism. In one embodiment, the input sensing mechanism includes a touch screen mechanism. The present systems and methods can include multi-touch detection technology. The multi-touch detection can give a user many types of input vectors for an electronic device. Touch surfaces can be capacitive touch sensing devices or any other implementation for touch sensing. The touch surface could also be single touch depending on the application needs.

Figure 44:
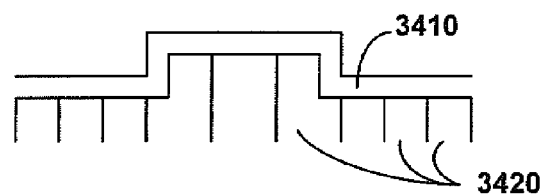
FIG. 44 is a block diagram of exemplary touch features in accordance with one embodiment of the present invention.

FIG. 44 is a block diagram of exemplary touch features in accordance with one embodiment of the present invention. A flexible touch surface 3410 is overlaid on top of elevation units 3420. The flexible touch surface 3410 can sense contact with other objects (e.g., fingers, stylus, other input devices, etc.). In one exemplary implementation, the flexible touch surface 3410 can detect touch on the lowered areas, top of a key, and sides of a key.

Figure 45:
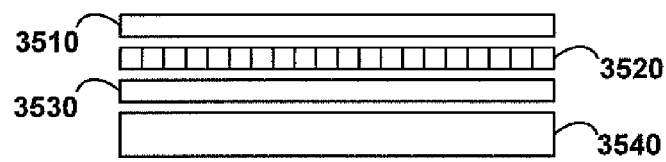
FIG. 45 is a block diagram of another exemplary embodiment where the touch sensitive layer is below the elevation units in accordance with one embodiment of the present invention.

FIG. 45 is a block diagram of another exemplary embodiment where the touch sensitive layer is below the elevation units in accordance with one embodiment of the present invention. This may be less expensive and more rugged of a solution (e.g., because the touch material does not have to bend or move, the touch material is protected, etc.). In one embodiment, the touch detection technology in the touch sensitive material 3530 is sensitive enough to detect a touch a short distance away. The top of the elevation units 3520 are overlaid with a flexible non-touch surface 3510. Alternatively, the touch layer could be below an elevation unit control layer 3540 with touch technology that is sensitive enough to do accurate detection from that distance.

In an alternate embodiment, both the flexible surface above the elevation unit layer and the material under the elevation units are touch sensitive. In one exemplary implementation, touch sensitive layer can be the main touchpad and the other an error correction assisting touchpad. Alternatively, both can be used to detect different things. For example, the top touchpad is used for detecting hover and in-air gesture inputs. The bottom touchpad is used for detecting touch and touch gesture inputs. These implementations can add functionality and precision to an electronic device.

Figure 46:
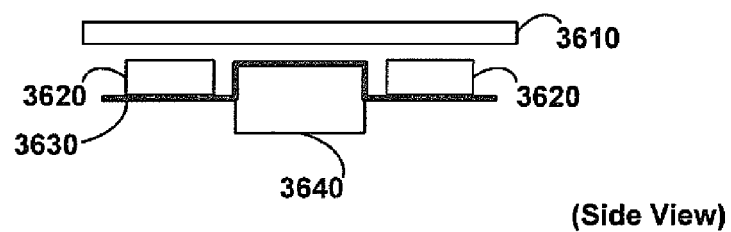
FIG. 46 is a block diagram of another exemplary embodiment where the touch surface is installed below the non-key areas and above the key areas in accordance with one embodiment of the present invention.

FIG. 46 is a block diagram of another exemplary embodiment where the touch surface 3630 is installed below the elevation units 3620 and above the stationary areas 3640. The touch surface thus does not move when the elevation units are raised and lowered, only the flexible layer 3610. This can make the system more rugged. In one embodiment, software algorithms can be used to combine the output from the different areas to create a single multi-touch area. In one exemplary implementation, the touch sensing areas are not one continuous touchpad. Thus, it is easier to fix one area by just replacing that one key or elevation unit. This implementation can also have side of key touch areas or not. If there is no side touch, the touch surface need not bend or stretch during the raising or lowering process.

Figure 47:
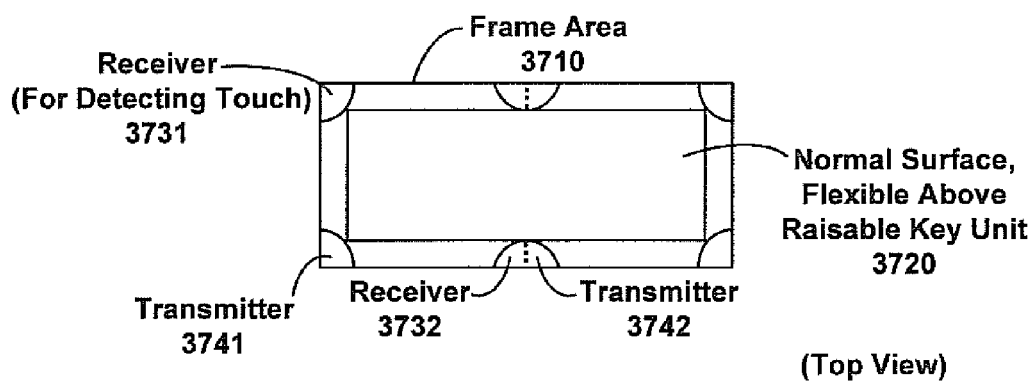
FIG. 47 is a block diagram of another exemplary embodiment where there is no touch surface in accordance with one embodiment of the present invention.

FIG. 47 is a block diagram of another exemplary embodiment where there is no touch surface in accordance with one embodiment of the present invention. The flexible surface 3720 above the elevation units does not have touch technology embedded in it. Instead, touches are detected by a series of transmitters (e.g., 3741 and 3742) and receivers (e.g., 3731 and 3732) embedded in the device or around the device (e.g., in frame area 3710). The transmitters send out signals that are reflected by fingers and are received by the receivers. The system then performs algorithms to determine the finger movement and any hover or touch information. These transmitters and receivers can be a variety of technologies, including infrared, ultrasonic, or other forms of wave propagation The electronic device can determine which areas of the touch surface should be active or inactive. In one embodiment, active touch areas are areas that register input interaction (e.g., touch movements, hovering, gestures, taps, etc.). These can be the lowered areas or the raised areas of the touch surface. An inactive touch area does not detect touches. This is useful when the area of the touch surface is used for other activities such as gaming or typing as a keyboard. A user can also select to turn off areas as touch surfaces for any reason. For example, a user makes a touch region inactive because the user is annoyed with accidentally hitting a certain touch area over and over.

The top and sides of surface shapes can provide important input information for an electronic device. The raised, top portions of surface shapes can be inactive or active touch regions. When the top of a surface shape is an active touch region, the surface shape itself can be its own touch area different from the other keys or lowered area. Thus, each surface shape in the system could control its own cursor or section of the device mode or game. For example, each surface shape can control the unit of a strategy game. The rest of the lowered region could be one unified touchpad.

Additionally, a user could perform a touch or gesture on the top of a button while pressing the button for a click. This adds many more input options for input. For example, a slide up and click indicates a jump in a game, while a slide down and click indicates a duck motion.

The side of the surface shape can have a touch surface also. For example, a side of a surface shape can be used to scroll up and down a display window or menu. A quick flick on the side of a surface shape can provide this functionality, or any others assigned to that device. A hold for a period of seconds on the side of a surface shape may also provide a different output response to the change in input.

Figure 48:
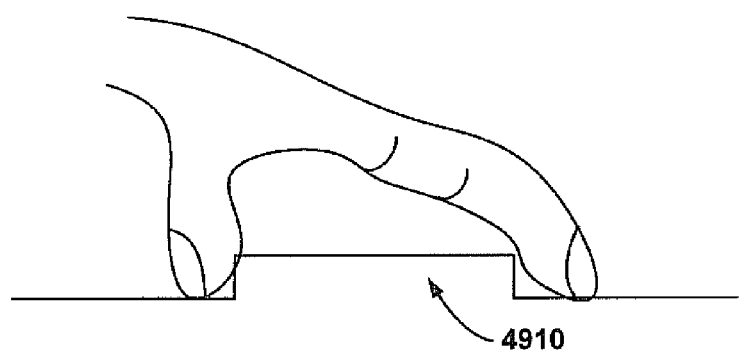
FIG. 48 is a block diagram of a raised elevation unit that is squeezable in accordance with one embodiment of the present invention.

FIG. 48 is a block diagram of a raised elevation unit 4910 that is squeezable in accordance with one embodiment of the present invention. A user can push in on the sides of the elevation unit. In one embodiment, the pressure can deform the elevation unit and provide a squished sensation that can be tactilely sensed. This squeeze can generate an input based on pressure or side click. Many applications can be developed to take advantage of such a squeeze feature.

Figure 49:
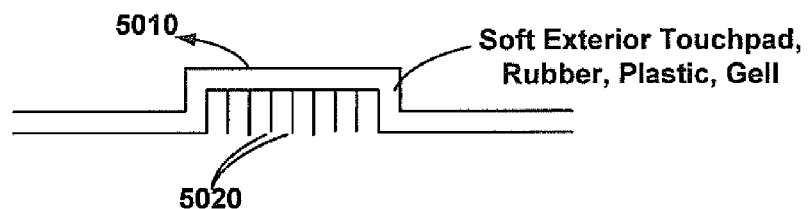
FIG. 49 is a block diagram of a squeezable key instead of an elevation unit in accordance with one embodiment of the present invention.
Figure 50:
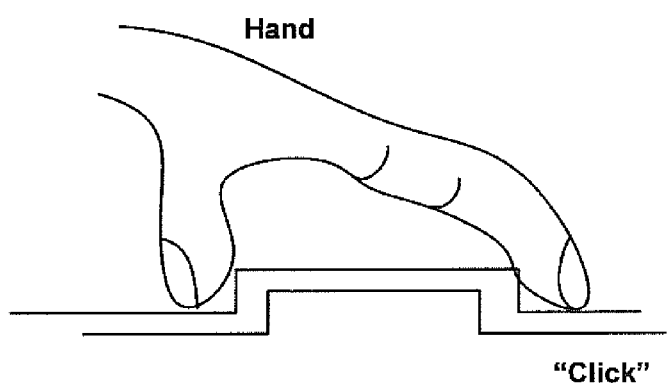
FIG. 50 is a block diagram of a user squeezing the key between fingers and when the deformable outer surface hits the fixed elevation units forming the key, a "side click" is detected in the system in accordance with one embodiment of the present invention.
Figure 51:
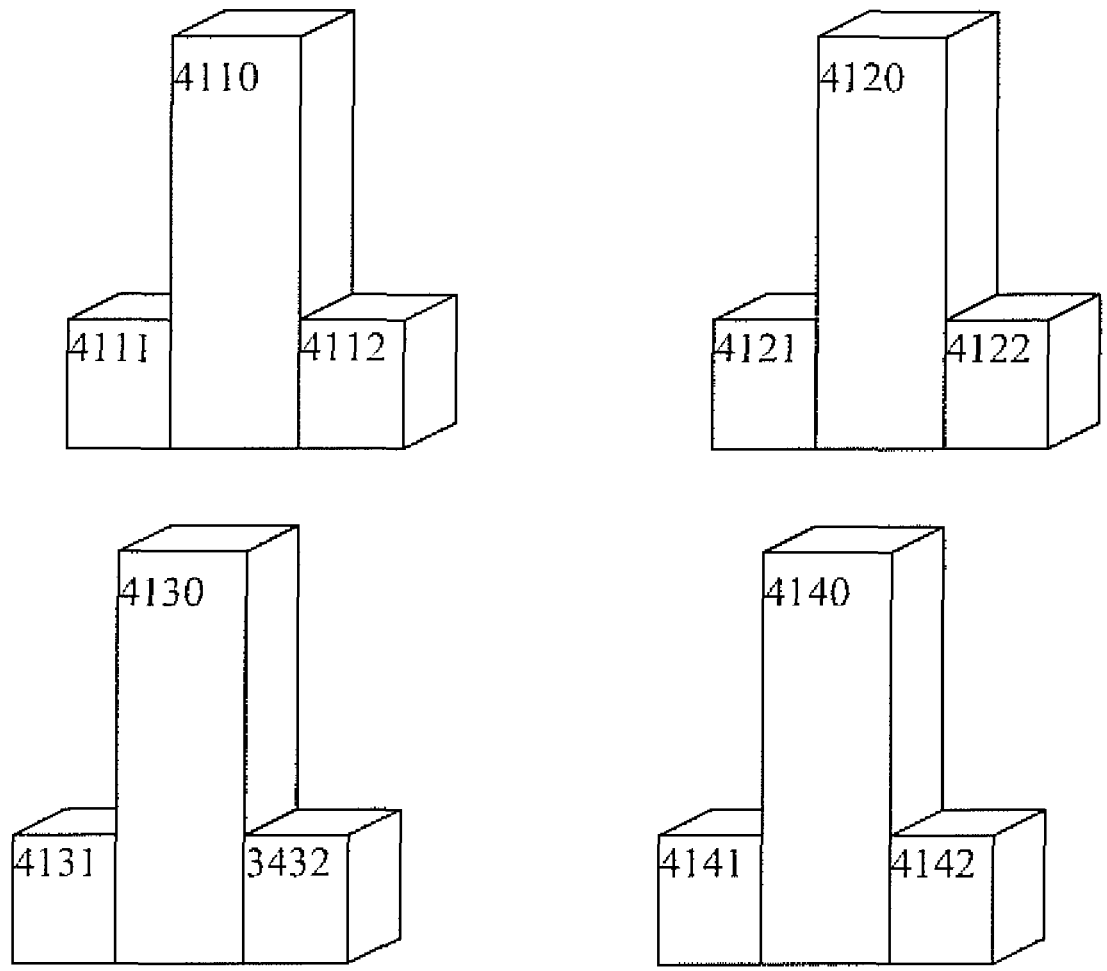
FIG. 51 is a block diagram of exemplary elevation units with additional vibrating components in accordance with one embodiment of the present invention.

FIG. 49 is a block diagram of a squeezable key 5010 made up of multiple elevation units 5020 instead of a single elevation unit. The raised elevation units form a key under a soft, deformable exterior surface (e.g., rubber, plastic, gel, etc.). FIG. 50 is a block diagram of a user squeezing the key between fingers and when the deformable outer surface hits the fixed elevation units forming the key, a "side click" is detected in the system.

Output Features

The present surface reconfiguration system can be utilized for highly useful output as well as the input described above. Elevation units can facilitate delivery of feedback output. The feedback can include feedback output associated with reaching an objective in an application. In one embodiment, elevation units facilitate a vibrating sensation similar to an explosion when a game piece is destroyed in a video game or item depicted in a movie incurs contact (e.g., a car crashes, a baseball is hit by a back, a door closes, etc.). The feedback can include feedback indicating implementation of an input operation.

The surface shapes created by raising and lowering the elevation units independently serve to create a tactile output for the user. Since the system is reconfigurable such that only the necessary keys are presented to the user at one time, the user does not need to look down to know which key is which. For example, in a directional arrow configuration, the user can simply feel which raised areas correspond to the "up" or "right" key since only these 4 keys are raised relative to the resting plane. The reconfigurable surface shapes can also be used to create tactile boundaries for the user. In one embodiment, an active touch area is bordered by raised elevation units, which indicate to the user the bounds of the active touch area. This indication is tactile as well as visual.

In one embodiment, the elevation units vibrate by being rapidly raised and lowered by an elevation unit control mechanism. In one exemplary implementation, vibrating characteristics can be imparted to the elevation units by additional vibrating components. FIG. 514 is a block diagram of exemplary elevation units with additional vibrating components. Elevation units 4110, 4120, 4130 and 4140 have corresponding respective vibrating components 4111, 4112, 4121, 4122, 4131, 4132, 4141, and 4142. Vibrating components 4111 and 4112 can be used to cause elevation unit 4110 to vibrate or can be used to enhance vibrations of elevation unit 4110 caused by the raising and lowering of elevation unit 4110.

In one embodiment, the elevation units can be manipulated to form a surface area shape or outline of an image or object. In one exemplary implementation, the surface area shape or outline can be tactilely and visually sensed. In an exemplary implementation, the surface area shape can correspond to an image being displayed in the area. For example, if a display screen associated with the surface area is presenting an image of a rock, elevation units corresponding to the same surface area can be altered to give the surface area a texture that tactilely has a rough or bumpy feeling corresponding to the rock.

The surface of the device can have a variety of characteristics, such as presenting images. The images can be static (e.g., picture, engraving, etc.). The images can be dynamic (e.g., programmable, video, etc.). In one embodiment, the surface layer can include a display or screen. As keys are raised, the display can compensate for any distortion in image. This adds a tactile element to displays, allowing the user to touch and press what the user sees. The adjustments to the elevation units can be coordinated with the image presentation and visa versa. In one embodiment, when an elevation unit is raised or lowered, an image associated with corresponding area of the surface component can be altered. For example, in a "whack-a-mole" or puzzle game implementation, a user could physically push the exact objects they wish to move. This facilitates a more compelling and immersive user experience.

Various Use Implementations

Reconfigurable surface features can be utilized to enhance user experience and interaction. For example, elevation units can be controlled to adjust a reconfigurable surface area to facilitate tactile interaction with a device. The elevation units can be raised and lowered to convey information to a user. In one exemplary implementation, the elevation units can be raised or lowered to tactilely indicate to a user when the user is touching an area of the reconfigurable surface area. The area of the reconfigurable surface shape can be raised or lowered to indicate an input device location (e.g., a key, a button, a joystick, etc.).

The elevation units can be controlled to adjust a reconfigurable surface shape to facilitate coordinated multiple sensory (e.g., tactile, visual, audio, etc.) interaction with a device. For example, an image (e.g., bear, rocks, moving vehicle, explosion, etc.) can be presented on a surface component and elevation units can be adjusted to create tactilely sensitive alterations (e.g., raising elevation units to correspond to fur of the bear, bumps in the rocks, movements of a vehicle, vibrations of an explosion, etc.) corresponding to the image. In one embodiment, the elevation units facilitate a vibrating sensation corresponding to a visual image depicted in a movie (e.g., a car crashes, a baseball is hit by a bat, a door closes, etc.).

The selectively reconfigurable surfaces can be utilized in input and output operations. For example, elevation units can be utilized to form raisable key matrix. The key matrix can be used as input and output for an electronic device. The key matrix can include physically clickable keys that are raised and lowered based on control signals from an electronic device. The device can recognize mode changes or user selections that call for a different input scheme on the raisable key matrix. The raisable key matrix can then be reconfigured by raising and lowering certain elevation units and activating corresponding areas of a touch surface to provide for the input and output scheme desired by the device mode or user.

Methods of reconfiguring the surface can depend on (1) application, mode, or game running on the device, (2) user chosen layout, and/or (3) automatic layout best configured for user (intelligent system layout). Layouts can include physical key areas, touch surface areas, LED identified active areas, clickable areas v. non-clickable areas.

Figure 52:
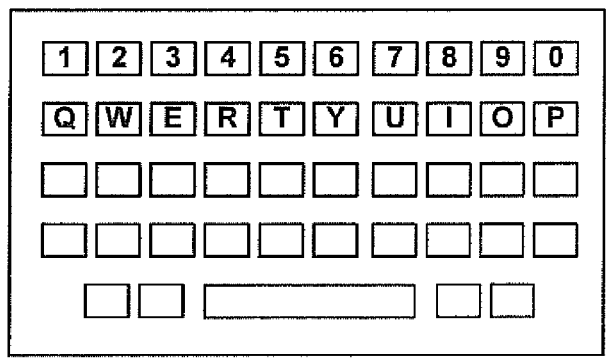
FIG. 52 is an implementation of a standard QWERTY keyboard layout in accordance with one embodiment of the present invention.
Figure 53:
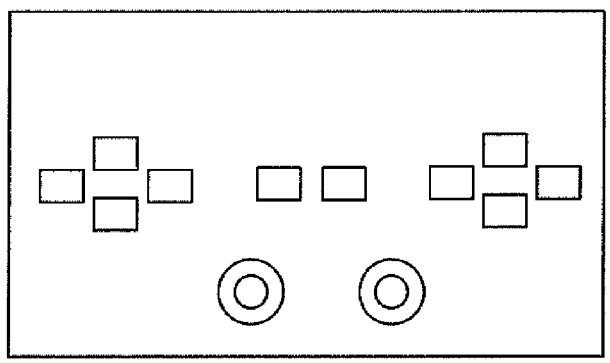
FIG. 53 shows an exemplary gaming layout configuration on the raisable, reconfigurable, touch surface in accordance with one embodiment of the present invention.
Figure 54:
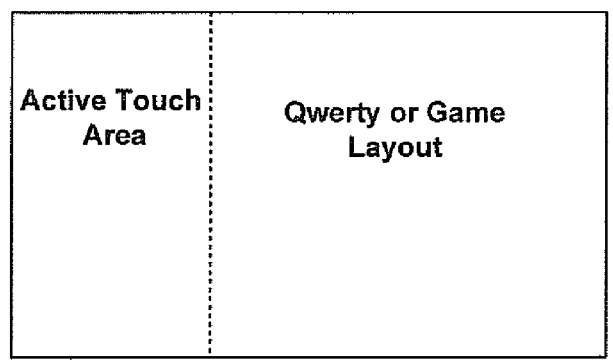
FIG. 54 shows a layout that combines an active touch area with a QWERTY keyboard or game layout in accordance with one embodiment of the present invention.

FIGS. 52 through 54 show various embodiments and key layout implementations. The same surface can be reconfigured by raising and lowering elevation units to form any of the layouts of FIG. 52 through 54, as examples. Any other configuration could be used. FIG. 52 is an implementation of a standard QWERTY keyboard layout. What input will be sent to the system based on a user clicking or pressing a key (formed by elevation units) can be presented to the user via LED lighting, a glyph configuration, or using a display screen as part of the flexible surface layer. Other display technologies are known in the art.

FIG. 53 shows an exemplary gaming layout configuration on the raisable, reconfigurable, touch surface. Standard gaming buttons are shown along with joystick implementations. This allows a user to use the same device as a text input and gaming machine. The transformation between key layouts can be performed quickly. In one exemplary implementation, the transformation can be performed in less than a second.

FIG. 54 shows a layout that combines a flat active touch area with a QWERTY keyboard or game layout. Because the size of the keys of the QWERTY keyboard can be adjusted larger and smaller, the device can change how much is devoted to a full touch area. Alternatively, the whole device can be an active touch area or touch screen with no elevation units raised.

Figure 55:
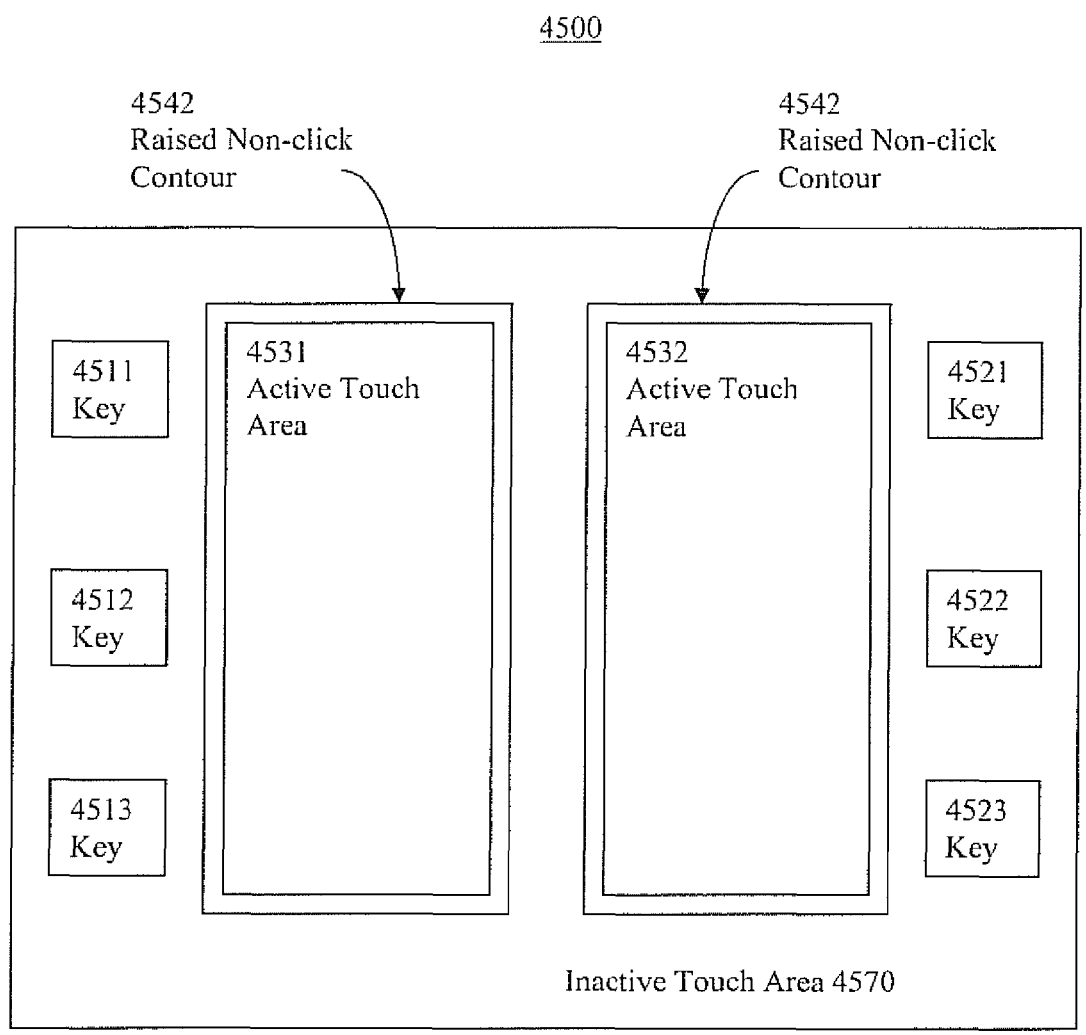
FIG. 55 shows an embodiment with clickable touch buttons, active touch areas surrounded by non-clickable raised for finger location feedback, and inactive touch areas in accordance with one embodiment of the present invention.

FIG. 55 is a block diagram of one embodiment of the present invention. FIG. 55 shows how the user input area can be bounded for better user interface and tactile response. The touch surface is active throughout the flexible surface on the top layer. The touch can be selected as active touch in some areas (4531, 4532) and inactive in others (4570). The inactive touch areas are helpful because those areas of the device are generally held by the palm of a users hand and might throw off the input data. The device can also have raised areas (formed by raising one or more elevation units). Raised areas can be raised non-click contours 4542 or clickable keys 4511, 4512, 4513, 4521, 4522, and 4523. The raised non-click contours 4542 provide the user tactile feedback to know where the active touch area is located. Elevation units can be composed of a hardware mechanism to prevent the clickable feature.

In one embodiment, developers of software and applications for the electronic device primarily reconfigure and customize the input area by software. The user is presented with a different input scheme based on the game or mode the device is in. Game developers can develop innovative gaming experiences from innovative input types.

Lastly, the raisable keyboard can be used to provide visual feedback. Keys can be raised individually or elevation units can be raised in shapes or patterns to provide output to the user. The device could then be used for notification, reading, and other applications which will be discussed in more detail later. In combination with a display, the device raises and lowers elevation units above the screen to create 3D images that can be seen as well as felt.

It is appreciated that present systems and methods can be utilized facilitate interaction in a variety of applications. Playing games on a mobile electronic device currently is a compromise when it comes to input: assign hotkeys to a tiny keyboard, use only a touch screen, or have a larger keyboard with a smaller screen. The present systems and methods offer greater flexibility. Complex games such as massively-multiplayer online games may require many buttons while simple touch games may require no buttons, just a touch surface. Other games require a joystick or a D-pad instead of a normal keyboard. The number of mobile games combined with the staggering variety of games for mobile devices are readily utilized with a present reconfigurable mobile electronic device for inputting information in many different ways.

The reconfigurable surface systems of the present invention have many potential uses for a variety of different applications. A reconfigurable surface shape system can be utilized in tutorial situations. As an application teaches a user how to use the application, various keys can rise to bring attention to a surface area as a tutorial explains how the application utilizes the key. This allows for swift, accurate, and fun user tutorials.

A reconfigurable surface system can be utilized where there are multiple relatively simple applications or interfaces. Thus, the input scheme for the user can be simplified for a more enjoyable user experience. While a device that is able to handle multiple applications may have to have a wide variety of various interface configurations available, simple applications typically utilize a relatively few input interface components at a time. The present approach allows a relatively simple surface interface to be utilized with an application while facilitating surface reconfiguration to handle the wide variety of possible application interfaces. In one embodiment, by being able to present a few relatively simple interface components at a time, the surface shapes can be large and easy to control. For example, playing the game Text Twist™ the 6 characters can rise up and act as buttons on the surface of the input area. In Playing Tic-Tac-Toe with a friend, your device areas can raise defined X's and 0's based on what areas were touched. Many types of in-game puzzles could be implemented as raised areas. In these simple games, if the raisable keyboard includes visual feedback (backlighting or a display), a main display may not be needed, or a smaller main display may be suitable.

Again, reconfigurable surfaces can be utilized by an application to provide feedback to a user. For example, a key (made up of one or more elevation units) can be related to firing a weapon in a game (e.g., each key in an area or on the surface can be dedicated to a weapon, etc.). When a user acquires a weapon as part of game play, the corresponding key is raised providing tactile feedback to the user that the weapon is available. In one embodiment, the user can use the key to fire the weapon. Additional adjustments over time can provide additional feedback to a user. In one exemplary implementation, a key slowly starts to lower as the ammunition for an associated weapon is decreased. Once a user reloaded the ammo as part of game play, the key could return to a fully raised position. These types of user feedback allow the user to pay attention to a gaming screen and still have physical feedback on various in-game information.

In one embodiment, surface shape areas are associated with various modes. For example a touch key can be associated with casting spells in a MMORPG. The user could perform a gesture and click to perform spell and perform a different gesture and click to perform spell two. Thus, the same finger can always be mapped to spells, which makes the game less complicated for the user.

Surface shapes can also slide. This feature is advantageous for puzzle games. Because of the side-touch feature on keys, when a user presses against the side of the key, the key could shift up by raising and lowering certain elevation units as discussed above. The same could be done with the top of the key.

Figure 56:
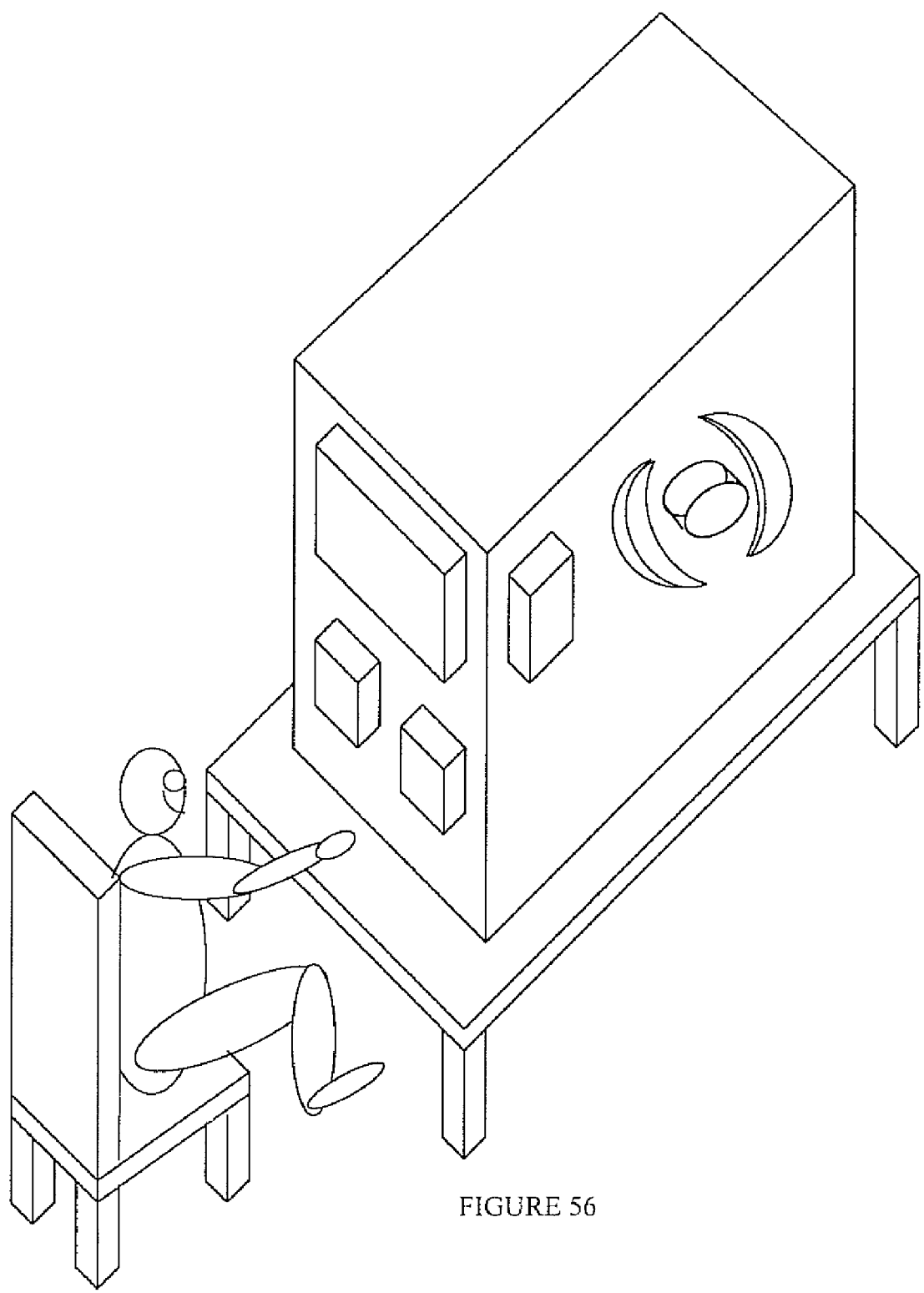
FIG. 56 is a block diagram of a gaming cube in accordance with one embodiment of the present invention.

Present systems and methods can also be incorporated in non-mobile implementations. FIG. 56 shows a gaming cube as opposed to a mobile electronic device. The gaming cube sits on a table and the sides of the device are reconfigurable, raisable, touch surfaces with displays. Users can enjoy all sorts of gaming experiences with other players. Alternatively, the table itself is a large reconfigurable, raisable, touch input device as described above. The device could rise up the game board for various games and users could play board games and/or video games on the surface. Game boards can rise out of a table. Battleships can rise out of a mobile battleship game.

Raisable surface areas are helpful in back or rear of device touch situations because a user is not actively looking at the back or rear of the device. Further, because users generally hold their devices very differently, the hand layouts of individuals will vary widely. Allowing the mobile device to reconfigure which zones on the back are active/inactive and raised/not raised is helpful for allowing the user comfortable input via the back of a mobile electronic device. This invention can be applied to the top, bottom, and sides of the device as needed and shown in various figures.

The elevation units can be small enough to form Braille knob imprints for reading Braille. The elevation units can raise and lower at a high enough pace that as the user reaches the right end of the Braille letter group on the right side of the input area, the left side can already be refreshed to the next Braille letter group. This is performed by the touch surface knowing where the tracing finger is located.

Alternatively, the device can raise English, Chinese, Japanese, or other lettering styles which are visible to the user. This allows the reconfigurable, raisable touch surface to act as a three dimensional output reading device.

Social activities between friends can be enhanced by the raisable action on the surface. Certain keys could represent friends. The key is raised when the friend is online or active in the social network. Making touch gestures on top of the key could send messages to that friend. Alternatively, one user could press an imprint, shapes, or words into their input surface and the imprint, shapes or words could appear on another's mobile electronic device. These implementations, and others, are useful when gaming socially as well. Instead of typing in whole sentences via a full QWERTY keyboard, the input area could be full of shortcuts by button, gesture, push, and other input methods discussed above.

Email communications can also be facilitated by method of using this reconfigurable, raisable key matrix system. An email key could exist that is raised when a new email arrives. Pressing the button would switch the device into email mode and raise the full QWERTY keyboard for text input mode. A swipe on the top of the email key could instead tell the email application to ignore the newly received email and lower the key. A side touch on the side of the email key could indicate a certain auto-reply to be sent to the user or to automatically place the email in a certain folder.

Methods of using a raisable, reconfigurable, touch keyboard system described herein is not limited to mobile electronic devices. The following descriptions of other applications are not all-inclusive and it is appreciated that there are a variety of other application implementations.

The raisable key implementation is useful for learning. Kids have to figure out puzzles via the system. The level of difficulty is adaptable to the user of the system. It could also be used as a typing teaching tool. The user starts with just a few simple keys and simple words. As the user learns to type, more keys on the keyboard are raised and more complicated words are formed.

The raisable key implementation is useful for large scale implementations. Larger size input areas with larger size keys can be useful in fields such as medical and construction. Big control units with adjustable keys by size are useful in making the decisions of professionals easy while giving adequate feedback. For example, in cases where workers have gloved hands, the keys could be made larger, raised higher, or spaced further apart to allow the user to feel the separate keys. In medical applications, only keys for valid functions could be raised, reducing or eliminating the possibility of making life threatening mistakes with unfamiliar machines. The same could be done on household appliances where many possible options are available, eliminating confusion and increasing device usability.

Figure 58:
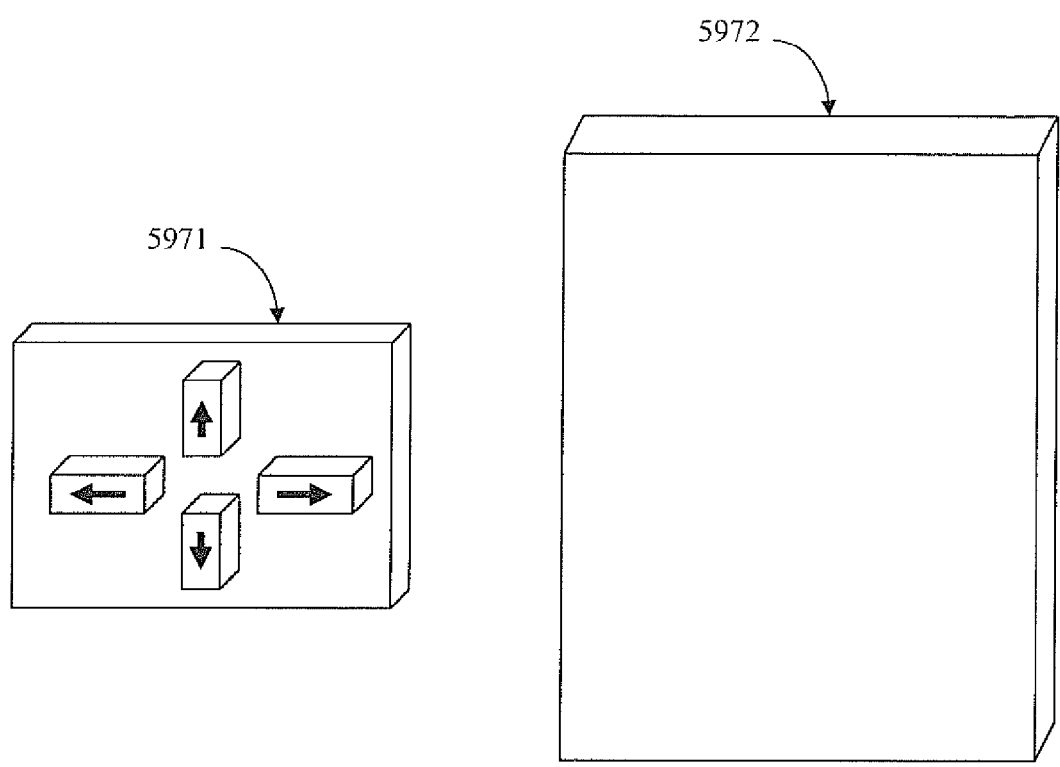
FIG. 58 is a block diagram of an exemplary remote control implementation in accordance with one embodiment of the present invention.

A present reconfigurable surface can be utilized in a remote control for various systems and apparatuses (e.g., an appliance, a television, a stereo, a toy, vehicle, a gaming console, etc.). FIG. 58 is a block diagram of an exemplary remote control implementation in accordance with one embodiment of the present invention. The remote controller 5971 includes a reconfigurable surface including directional input key raised in accordance with the present systems and methods. The remote controller 5971 is utilized to control features of the remote device 5972. It is appreciated the remote device can be a variety of different devices (e.g., a television, a stereo, a remote controlled vehicle, an appliance, etc.). The remote controller 5971 can also be utilized to control an application implemented on the remote device 5972. For example, the remote controller 5971 can be utilized to control game pieces or images of a game application running on the remote device 5972 (e.g., a computer, a television with a game console application running, etc.).

Figure 59:
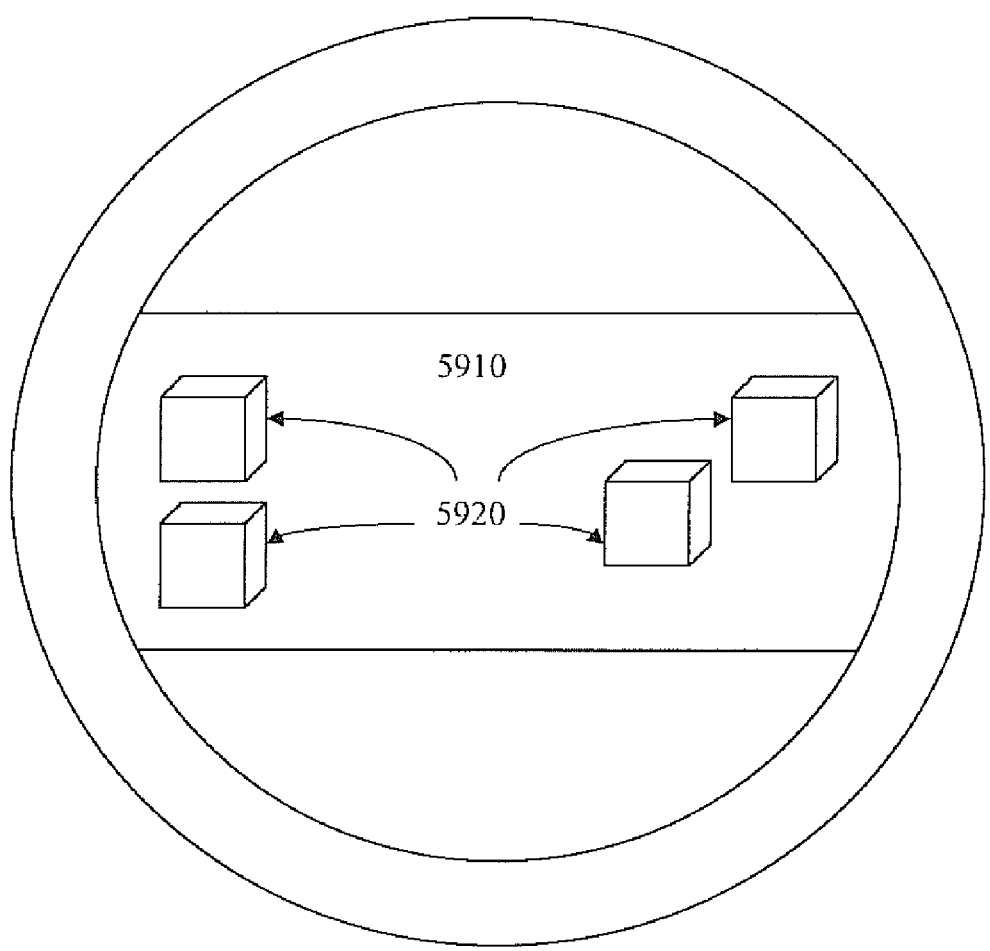
FIG. 59 is a block diagram of one exemplary vehicle wheel with a raisable touch surface in accordance with one embodiment of the present invention.

A present reconfigurable surface can also be incorporated in various systems and apparatuses (e.g., an appliance, a television, a stereo, a toy, a vehicle, a communication device, gaming consoles, office equipment, etc.). For example, the reconfigurable surface implementations of the present invention are useful for vehicle applications. The steering wheel of a car, for example, can be equipped with such a raisable touch surface. FIG. 59 is a block diagram of one exemplary vehicle wheel 5900 with a raisable touch surface 5910 in accordance with one embodiment of the present invention. Most of the wheel would be set as inactive touch and inactive click areas. But depending on where the user places their hands, a number of useful keys (e.g., keys 5920, etc.) could be raised to allow the user to adjust the cruise control, stereo, windshield wipers, and etcetera. A raisable keyboard could also be placed next to the driver seat in front of the console, and used as a touchpad to navigate the multimedia system, or as keys to navigate through menus, or number keys to dial phone numbers.

Figure 57:
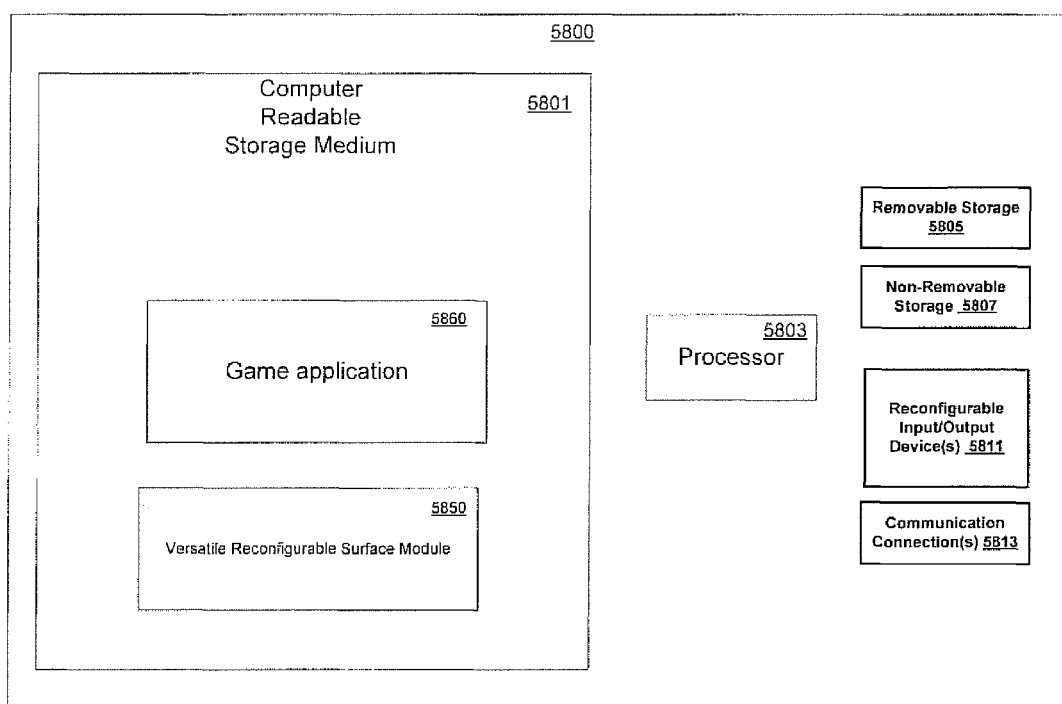
FIG. 57 shows an exemplary computer system 5800 according to one embodiment.

FIG. 57 shows an exemplary computer system 5800 according to one embodiment. Computer system 5800 depicts the components of a basic computer system providing the execution environment for certain hardware-based and software-based functionality for the above described embodiments. For example, computer system 5800 can be a system upon which a versatile reconfigurable surface module 5850 and one or game applications 5860 are instantiated. Versatile reconfigurable surface module 5850 includes instructions for directing implementation of a surface reconfiguration method (e.g., surface reconfiguration method 400, etc.). Computer system 5800 can be implemented as, for example, a server computer system, workstation computer system, desktop computer system, or laptop computer system. Similarly, computer system 5800 can be implemented as a mobile, handheld device. Computer system 5800 typically includes at least some form of computer readable media (e.g., computer readable storage medium 5801). Computer readable media can be a number of different types of available media that can be accessed by computer system 5800 and can include, but is not limited to, computer storage media.

In its most basic configuration, computer system 5800 typically includes processing unit 5803 and a computer readable storage medium 5801. Depending on the exact configuration and type of computer system 5800 that is used, memory 5801 can be volatile (e.g., such as DRAM, etc.), non-volatile (e.g., such as ROM, flash memory, etc.) or some combination of the two. Similarly, the memory 5801 can comprise other devices besides solid-state devices, such as, for example, magnetic disk-based media, optical media, or the like. Instructions for directing the processor in performance of present methods (e.g., instructions associated with surface shape reconfiguration method 400, etc.) can be included on the storage media and when executed direct the processor in performance of present methods and processes.

Additionally, computer system 5800 can include other mass storage systems (e.g., removable 5805 and/or non-removable 5807) such as magnetic or optical disks or tape. Similarly, computer system 5800 can include input/output devices 5811 that have a reconfigurable surface. Computer system 5800 can further include network and communications connections 5813 to other devices, computers, networks, servers, etc. using either wired or wireless media.

Many other devices or subsystems (not shown) may be connected in a similar manner (e.g., document scanners, digital cameras and so on). Conversely, all of the devices shown in FIG. 58 need not be present to practice the present invention. The devices and subsystems can be interconnected in different ways from that shown in FIG. 58. Code to implement the present disclosure can be stored in computer-readable storage media such as one or more of system memory, fixed disk, optical disk, or floppy disk. The operating system provided on computer system 5800 may be MS-DOS®, MS-WINDOWS®, OS/2®, UNIX®, Linux®, or another known operating system.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Electronic devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

We claim:

1. A surface reconfiguration system of an electronic device comprising:
    a flexible surface attached to the electronic device and having a selectively variable shape;
    an actuation sensing component for sensing actuation activity associated with the shape in the flexible surface, wherein the flexible surface and actuation sensing component interact to provide both input and output to a user of the system;
    a piezoelectric motor ring including piezoelectric elements placed around the ring for generating a standing wave when a voltage is applied consecutively to the piezoelectric elements; and
    wherein a rotational force of the standing wave is transferred to the actuation sensing component to move the actuation sensing component up and down, wherein no extra power is required to maintain the stationary height of the actuation sensing component.

2. The surface system of claim 1 wherein the flexible surface and actuation sensing component form a tactile input component.

3. The surface reconfiguration system of claim 2 wherein the tactile input component senses touch.

4. The surface reconfiguration system of claim 2 wherein the tactile input component is a physically clickable input key.

5. The surface reconfiguration system of claim 1 wherein the flexible surface includes a light emitting diode array.

6. The surface reconfiguration system of claim 1 wherein the flexible surface includes a liquid crystal display screen.

7. The surface reconfiguration system of claim 1 wherein a portion of the surface associated with the selectively variable shape is raised and lowered.

8. The surface reconfiguration system of claim 7 further comprising:
    processing circuitry;
    wherein the processing circuitry acquires actuation data from the actuation sensing component, processes the actuation data, and directs the raising and lowering of the selectively variable shape in the flexible surface.

9. A surface reconfiguration apparatus comprising:
    elevation units that adjust a physical shape of an input and output surface area; and
    an elevation control component that physically adjusts individual elevation units, wherein the elevation control component includes:
    a piezoelectric motor ring including piezoelectric elements placed around the ring for generating a standing wave when a voltage is applied consecutively to the piezoelectric elements; and
    wherein a rotational force of the standing wave is transferred to the elevation units to move the elevation units up and down, wherein the elevation units can remain stationary more than one height, and the apparatus requires no extra power to maintain the stationary height of the elevation units.

10. The surface reconfiguration apparatus of claim 9 wherein elevation units are physically clickable; and
    wherein one or more elevation units adjust the physical shape of the surface area to form a physically clickable input key, wherein the physically clickable key is only clickable when the tactile input component is in a raised condition.

11. The surface reconfiguration apparatus of claim 10 wherein the entire input key is depressed even if only a portion of the elevation units forming the input key are actuated.

12. The surface reconfiguration apparatus of claim 10 wherein the surface area includes a sensing mechanism for sensing touch input; and
wherein the apparatus can receive touch input on any portion of the input key covered by the surface area.

13. The surface reconfiguration apparatus of claim 10 wherein the surface area includes a graphical output display selectively identifying the type of input provided to the apparatus upon actuation of each input key.

14. The surface reconfiguration apparatus of claim 13 wherein the surface area includes a sensing mechanism for sensing hover input.

15. The surface reconfiguration apparatus of claim 13 further comprising a sensing mechanism for sensing touch.

16. The surface reconfiguration apparatus of claim 13 wherein the elevation units can remain stationary at one of three or more heights.

17. The surface reconfiguration apparatus of claim 9 wherein the elevation units, surface area, and elevation control component are incorporated in independent mechanism layers that are interchangeable with other respective elevation unit mechanism layers, surface area layers and elevation control component mechanism layers.

18. The surface reconfiguration apparatus of claim 9 wherein the surface area includes a graphical output display.

19. A surface reconfiguration method comprising:
performing an elevation determination process;
performing an elevation unit adjustment process; wherein the elevation unit adjustment process changes the physical shape of an input and output surface area, wherein the elevation unit adjustment process includes manipulating piezoelectric elements to create a standing wave when a voltage is applied consecutively to the piezoelectric elements, wherein the standing wave applies force on the elevation unit to position the elevation unit at a designated elevation without consuming extra power to return the elevation unit to the designated elevation;
performing a query on characteristics associated with elevation unit element adjustments; and
establishing elevation unit adjustments automatically based upon results of the query.

20. The surface reconfiguration method of claim 19 further comprising receiving input.

21. The surface reconfiguration method of claim 20 wherein receiving input includes receiving touch sensed input.

22. The surface reconfiguration method of claim 20 wherein receiving input includes receiving physical click input from the physical actuation of one or more adjacent elevation units.

23. The surface reconfiguration method of claim 19 further comprising stimulating output.

24. The surface reconfiguration method of claim 23 wherein stimulating output includes forming human-readable characters.

25. The surface reconfiguration method of claim 23 wherein stimulating output includes forming non-clickable contours to indicate boundaries in a surface.

26. The surface reconfiguration method of claim 19 wherein the query can include requesting configuration information from an application.

27. The surface reconfiguration method of claim 19 wherein the query includes:
determining an activity history; and
extrapolating a desirable configuration.

28. The surface reconfiguration method of claim 19 wherein:
the characteristics include finger size and position; and
the establishing elevation unit adjustments automatically include adjusting the elevation units to form a key in an area in relation to the finger size and position.

29. A surface reconfiguration system comprising:
a input and output surface area including a flexible surface material that senses touch input and a graphical output display screen;
physically clickable elevation units that adjust a physical shape of the input and output surface area, wherein one or more elevation units adjust the physical shape of the surface area to form a physically clickable input key, wherein the physically clickable input key is only clickable when in a raised condition;
an elevation control component that physically adjusts individual elevation units, wherein the elevation control component includes:
a piezoelectric motor ring including piezoelectric elements placed around the ring for generating a standing wave when a voltage is consecutively applied to the piezoelectric elements; and
wherein a rotational force of the standing wave is transferred to the elevation units to move the elevation units up and down, wherein the system requires no extra power to maintain the stationary height of the elevation units;
wherein the surface area shape can be reconfigured by the physical adjustments to elevation units;
wherein the touch input sensing can be activated and deactivated for different sections of the surface area;
wherein the graphical output display screen displays the type of input the actuation of an elevation unit will provide.

30. A surface reconfiguration apparatus comprising:
elevation units that adjust a selectively variable physical surface shape of an input and output surface area; and
an elevation control component that physically adjusts individual elevation units, wherein the elevation control component includes:
a piezoelectric motor ring including piezoelectric elements for generating torque from a standing wave when a voltage is applied to consecutive piezoelectric elements around the ring; and
wherein a rotational torque force of the standing wave is transferred to the elevation units to move the elevation units up and down, wherein the elevation units can remain stationary more than one height, and the apparatus requires no extra power to maintain the stationary height of the elevation units;
wherein the input and output surface area senses touch.

31. The surface reconfiguration apparatus of claim 30 wherein the elevation units have corresponding respective vibrating components that add vibration to the respective elevation units.

32. The surface reconfiguration apparatus of claim 30 wherein the elevation units are incorporated in a steering wheel of a motorized vehicle.

33. The surface reconfiguration apparatus of claim 30 wherein touch detection technology recognizes touches on a substantially horizontal side and a substantially vertical side of the surface shape that is accessible to the user wherein a user can push or tap on a side of a surface shape,
wherein the sensed touch of the push or tap is detected, a processor responds to this detection by issuing a software command to move a location of the surface shape, wherein the elevation control component lowers the elevation units nearest to the push or tap and raises elevation units at the opposite end of the surface shape from the push or tap.

34. The surface reconfiguration apparatus of claim 30 wherein establishing elevation unit adjustments includes automatically adjusting the elevation units to form a key in an area in relation to the finger size and position.

35. The surface reconfiguration apparatus of claim 30 wherein the elevation units are included in a game board.

36. A surface reconfiguration apparatus comprising:
elevation units that adjust a selectively variable physical surface shape of an input and output surface area; and
an elevation control component that physically adjusts individual elevation units, wherein the elevation control component includes:
a piezoelectric motor ring including piezoelectric elements for generating a standing wave when a voltage is applied to consecutive piezoelectric elements around the ring; and
wherein a rotational force of the standing wave is transferred to the elevation units to move the elevation units up and down, wherein the elevation units can remain stationary more than one height, and the apparatus requires no extra power to maintain the stationary height of the elevation units;
wherein a plurality of cartridges including an elevation unit cartridge and a surface cartridge are incorporated in independent mechanism layers and the plurality of cartridges are interchangeable.

37. A surface reconfiguration apparatus of claim 36 wherein the surface cartridge includes a flexible surface with images.

38. A surface reconfiguration apparatus wherein of claim 36 wherein the images are permanent.

39. A surface reconfiguration apparatus of claim 36 wherein at least one of the plurality of cartridges includes a pattern controller component and the pattern controller component is a plate that has pattern templates formed in the plate.

40. A surface reconfiguration apparatus comprising:
elevation units that adjust a selectively variable physical surface shape of an input and output surface area; and
an elevation control component that physically adjusts individual elevation units, wherein the elevation control component includes:
a piezoelectric motor ring including piezoelectric elements placed around the ring for generating a standing wave when a voltage is consecutively applied to the piezoelectric elements; and
wherein a rotational force of the standing wave is transferred to the elevation units to move the elevation units up and down, wherein the elevation units can remain stationary more than one height;
wherein the elevation units are programmably click/non-click wherein a non-click elevation unit is temporarily set to not be actuatable as a clickable button,
wherein the elevation units are programmably raised/non-raised, wherein the input and output surface area includes touch detection capability and can be programmably set to have some regions detect touch while others temporarily do not detect touch, and
wherein the surface reconfiguration apparatus can simultaneously include regions with all of: raised elevation units, non-raised elevation units, clickable elevation units, non-click elevation units, touch detection surface area, and non-touch detection surface area.

41. The surface reconfiguration apparatus of claim 40 wherein click/non-click and touch/non-touch is controlled by software implemented by a processor.

42. The surface reconfiguration apparatus of claim 40 wherein consecutive raised, non-click elevation units in a non-touch surface area region act as a contour to provide tactile and visual output of a boundary on the surface of the device.

43. A surface reconfiguration apparatus comprising:
elevation units that adjust a selectively variable physical surface shape of a grip surface area; and
an elevation control component that physically adjusts individual elevation units, wherein the elevation control component includes:
a piezoelectric motor ring including piezoelectric elements placed around the ring for generating a standing wave when a voltage is consecutively applied to the piezoelectric elements; and
wherein a rotational force of the standing wave is transferred to the elevation units to move the elevation units up and down, wherein the elevation units can remain stationary more than one height.

44. The surface reconfiguration apparatus of claim 43 wherein the grip surface area is on a vertical side of the surface reconfiguration apparatus.

45. The surface reconfiguration apparatus of claim 43 wherein the grip surface area is on a bottom side of the surface reconfiguration apparatus, wherein the bottom side is a side opposite of a main viewing side.

46. The surface reconfiguration apparatus of claim 45 wherein the main viewing side also includes a grip surface area with a selectively variable physical shape adjusted by an additional set of elevation units and elevation control component.

* * * * *